(12) United States Patent
Liu et al.

(10) Patent No.: US 10,114,577 B2
(45) Date of Patent: Oct. 30, 2018

(54) DATA READING METHOD, DEVICE AND SYSTEM

(71) Applicant: Huawei Technologies Co., Ltd., Shenzhen (CN)

(72) Inventors: Hongkuan Liu, Hangzhou (CN); Laijun Zhong, Shenzhen (CN); Jiang Tan, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/708,815

(22) Filed: Sep. 19, 2017

(65) Prior Publication Data

US 2018/0004451 A1 Jan. 4, 2018

Related U.S. Application Data

(63) Continuation of application No. PCT/CN2015/074755, filed on Mar. 20, 2015.

(51) Int. Cl.
*G06F 3/06* (2006.01)
*G06F 12/0806* (2016.01)
(Continued)

(52) U.S. Cl.
CPC .......... *G06F 3/0644* (2013.01); *G06F 3/0604* (2013.01); *G06F 3/0683* (2013.01);
(Continued)

(58) Field of Classification Search
CPC .... G06F 3/0604; G06F 3/0644; G06F 3/0683; G06F 12/0806; G06F 12/16; G06F 15/173
See application file for complete search history.

(56) References Cited

U.S. PATENT DOCUMENTS 6,631,448 B2 * 10/2003 Weber ................ G06F 12/0828
711/119
9,026,736 B1 * 5/2015 Venkat ................ G06F 12/0877
711/113
(Continued)

FOREIGN PATENT DOCUMENTS

CN 1545034 A 11/2004
CN 102866963 A 1/2013
CN 103440223 A 12/2013

OTHER PUBLICATIONS

Machine Translation and Abstract of Chinese Publication No. CN1545034, Nov. 10, 2004, 15 pages.
(Continued)

*Primary Examiner* — Aracelis Ruiz
(74) *Attorney, Agent, or Firm* — Conley Rose, P.C.

(57) ABSTRACT

A data reading method, a data processing device, and a data processing system are provided. The method, executed by a first control node, includes receiving a reading message forwarded by a data switching device, where the reading message is used to instruct the first control node to read first data, and the reading message is sent by a second control node to the data switching device; if a data status identifier of the first data in a first storage node is a valid identifier, reading the first data from the first storage node, and sending the read first data to the data switching device, so that the data switching device forwards the read first data to the second control node, where the valid identifier indicates that the first data on the first storage node is available. The present application ensures that the latest first data in the node group is read.

20 Claims, 7 Drawing Sheets

(51) Int. Cl.
*G06F 12/16* (2006.01)
*G06F 15/173* (2006.01)

(52) U.S. Cl.
CPC .......... *G06F 12/0806* (2013.01); *G06F 12/16* (2013.01); *G06F 15/173* (2013.01)

(56) References Cited

U.S. PATENT DOCUMENTS

2001/0013089 A1  8/2001  Weber
2004/0003184 A1  1/2004  Safranek et al.

OTHER PUBLICATIONS

Machine Translation and Abstract of Chinese Publication No. CN102866963, Jan. 9, 2013, 10 pages.
Machine Translation and Abstract of Chinese Publication No. CN103440223, Dec. 11, 2013, 21 pages.
"OpenFlow Switch Specification," Open Networking Foundation, Version 1.4.0 (Wire Protocol 0x06), Oct. 14, 2013, ONF TS-012, 206 pages.
Foreign Communication From a Counterpart Application, PCT Application No. PCT/CN2015/074755, English Translation of International Search Report dated Dec. 15, 2015, 2 pages.
Foreign Communication From a Counterpart Application, PCT Application No. PCT/CN2015/074755, English Translation of Written Opinion dated Dec. 15, 2015, 6 pages.
Foreign Communication From a Counterpart Application, European Application No. 15885819.1, Extended European Search Report dated Feb. 16, 2018, 5 pages.

\* cited by examiner

DATA READING METHOD, DEVICE AND SYSTEM

CROSS-REFERENCE TO RELATED APPLICATION

This application is a continuation of International Application No. PCT/CN2015/074755, filed on Mar. 20, 2015, the disclosure of which is hereby incorporated by reference in its entirety.

TECHNICAL FIELD

Embodiments of the present application relate to the storage field, and in particular, to a data reading method, a device, and a system.

BACKGROUND

Currently, multiple central processing units (CPU) in a server are connected to a same bus, and processor nodes (namely, the CPUs) each are connected to one cache. When working, a cache node (namely, the Cache) connected to each processor node that needs to process first data in service processing mirrors the first data in a memory device, and caches the mirrored first data into each cache node. If the first data cached by other cache nodes is not modified in time after the first data cached by a cache node is updated by a processor node, cache coherence cannot be achieved. There are roughly two specific causes of incoherence of the cached first data. For one thing, a processor node modifies the first data in a cache node, but the first data cached in other cache nodes is not modified accordingly. For another, after modifying the first data in a cache node during execution of a service process, a processor node does not write back the modified first data to the memory device in time; and/or while modifying the first data cached in other cache nodes accordingly, a processor node migrates the service process between processor nodes at the same time, and consequently unmodified first data is incorrectly invoked in the migrated service process, causing incorrect execution of the service processing.

Broadcasting of a data request and bus arbitration on the data request are used in bus snooping protocols (for example, the Modified, Shared or Invalid (MSI) protocol, the Modified, Exclusive, Shared or Invalid (MESI) protocol, and the Modified, Owned, Exclusive, Shared or Invalid (MOESI) protocol) in the prior art, and can resolve a cache coherence problem on multiple cache nodes mounted to a same bus. However, in terms of sending a data request, the bus snooping protocol depends on complete sequentiality of a shared bus, and only one processor can occupy the bus at each moment, resulting in a relatively long communication delay and relatively poor extensibility. In addition, during updating of a cache status, the snooping protocol uses a system-wide broadcasting manner, resulting in excessively high bus communication load and high power consumption. Moreover, a snooping-based protocol is inapplicable to a message network because the message network is unordered and cannot ensure sequentiality and an atomic operation of the similar bus. In addition, the message network cannot implement real-time snooping. If a broadcasting mechanism is used, a relatively long communication delay may be caused.

SUMMARY

In view of this, embodiments of the present application provide a data reading method, a device, and a system, to implement data consistency between storage nodes in a message network.

According to a first aspect, the embodiments of the present application provide a data reading method, where the data reading method includes receiving, by a first control node, a reading message forwarded by a data switching device, where the reading message is used to instruct to read first data, and the reading message is sent by a second control node to the data switching device and then forwarded by the data switching device to other control nodes other than the second control node in a node group; and if a data status identifier of the first data in a first storage node is a valid identifier, reading, by the first control node, the first data from the first storage node, resetting the data status identifier of the first data in the first storage node from the valid identifier to an undefined identifier, recording a destination control node of the first data in the first storage node as the second control node, and sending the read first data to the data switching device, so that the data switching device forwards the read first data to the second control node, where the valid identifier indicates that the first data on the first storage node is available, and the undefined identifier indicates that the destination control node provides currently latest first data; where the node group includes a storage node that is in a multiprocessor network and that stores the first data, a maximum of one storage node in the node group stores the first data whose data status identifier is a valid identifier, and the data status identifier of the first data stored in the storage node in the node group is reset to the valid identifier when the storage node in the node group stores available first data; the node group further includes a control node connected to the storage node in the node group; the control node is configured to exercise read/write control on the connected storage node, including setting a data status identifier for the first data stored in the connected storage node; the first control node is a control node in the node group, and the first storage node is a storage node that is in the node group and that is connected to the first control node.

With reference to the first aspect, in a first possible implementation manner, the receiving, by a first control node, a reading message forwarded by a data switching device may comprise receiving, by the first control node, the reading message that is multicast by the data switching device to the other control nodes other than the second control node in the node group.

With reference to the first aspect or the first possible implementation manner of the first aspect, in a second possible implementation manner, the method further includes, when receiving a notification message forwarded by the data switching device, setting, by the first control node, the data status identifier of the first data in the first storage node from the undefined identifier to an invalid identifier, where the invalid identifier indicates that the first data in the first storage node is unavailable; where the notification message is sent by the second control node to the data switching device when the following condition is met, after receiving the first data sent by the first control node and caching the first data into the second storage node, the second control node sets a data status identifier of the first data in the second storage node to a valid identifier.

With reference to the first aspect or the first possible implementation manner of the first aspect, in a third possible implementation manner, the method further includes, if the data status identifier of the first data in the first storage node is the undefined identifier, forwarding, by the first control node, the reading message to the destination control node of the first data in the first storage node, so that when a data status identifier of the first data in a connected destination storage node is a valid identifier, the destination control node reads the first data from the destination storage node and sends the read first data to the data switching device, and the data switching device forwards the read first data to the second control node.

With reference to the third possible implementation manner of the first aspect, in a fourth possible implementation manner, the forwarding, by the first control node, the reading message to the destination control node of the first data in the first storage node may comprise obtaining, by the first control node, information about the destination control node of the first data in the first storage node; and sending, by the first control node, the reading message that carries a unicast instruction to the data switching device, so that the data switching device unicasts the reading message to the destination control node when the unicast instruction is detected and the unicast instruction is directed to the destination control node.

With reference to the third possible implementation manner of the first aspect or the fourth possible implementation manner of the first aspect, in a fifth possible implementation manner, the method further includes, when receiving a notification message forwarded by the data switching device, setting, by the first control node, the data status identifier of the first data in the first storage node from the undefined identifier to an invalid identifier, where the invalid identifier indicates that the first data in the first storage node is unavailable; where the notification message is sent by the destination control node to the data switching device when the following condition is met, after receiving the first data sent by the first control node and caching the first data into the destination storage node, the destination control node sets the data status identifier of the first data in the destination storage node to the valid identifier.

With reference to the first aspect or any one of the foregoing possible implementation manners of the first aspect, in a sixth possible implementation manner, a condition for which the reading message is sent by the second control node to the data switching device includes the second control node needs to write updated first data to the connected second storage node, and the data status identifier of the first data in the second storage node is not the valid identifier.

With reference to the first aspect, in a seventh possible implementation manner, a condition for which the reading message is sent by the second control node to the data switching device is the second control node receives a write-back message; where storage nodes in the node group include a memory node that is in the multiprocessor network and stores the first data, and a cache node that is in the multiprocessor network and is configured to store mirrored data of the first data; control nodes in the node group include a processor node bus-connected to the cache node in the node group, and a controller connected to the memory node; the second control node is a controller in the node group, and the first control node is a processor node, in the node group, that sends the write-back message; the write-back message is sent by the processor node in the node group to the controller in the node group by means of the data switching device when the data status identifier of the first data in the bus-connected cache node is the valid identifier and the first data needs to be written back to the memory node in the node group.

According to a second aspect, the embodiments of the present application provide a first control node, where the first control node includes a message receiving unit configured to receive a reading message forwarded by a data switching device, where the reading message is used to instruct to read first data, and the reading message is sent by a second control node to the data switching device and then forwarded by the data switching device to other control nodes other than the second control node in a node group; and a response unit configured to, if a data status identifier of the first data in a first storage node is a valid identifier, read the first data from the first storage node, reset the data status identifier of the first data in the first storage node from the valid identifier to an undefined identifier, record a destination control node of the first data in the first storage node as the second control node, and send the read first data to the data switching device, so that the data switching device forwards the read first data to the second control node, where the valid identifier indicates that the first data on the first storage node is available, and the undefined identifier indicates that the destination control node provides currently latest first data; where the node group includes a storage node that is in a multiprocessor network and that stores the first data, a maximum of one storage node in the node group stores the first data whose data status identifier is a valid identifier, and the data status identifier of the first data stored in the storage node in the node group is reset to the valid identifier when the storage node in the node group stores available first data; the node group further includes a control node connected to the storage node in the node group; the control node is configured to exercise read/write control on the connected storage node, including setting a data status identifier for the first data stored in the connected storage node; the first control node is a control node in the node group, and the first storage node is a storage node that is in the node group and that is connected to the first control node.

With reference to the second aspect, in a first possible implementation manner, that the message receiving unit receives a reading message forwarded by the data switching device may comprise the message receiving unit is configured to receive the reading message that is multicast by the data switching device to the other control nodes other than the second control node in the node group.

With reference to the second aspect or the first possible implementation manner of the second aspect, in a second possible implementation manner, the response unit is further configured to, when receiving a notification message forwarded by the data switching device, set the data status identifier of the first data in the first storage node from the undefined identifier to an invalid identifier, where the invalid identifier indicates that the first data in the first storage node is unavailable; where the notification message is sent by the second control node to the data switching device when the following condition is met, after receiving the first data sent by the first control node and caching the first data into the second storage node, the second control node sets a data status identifier of the first data in the second storage node to a valid identifier.

With reference to the second aspect or the first possible implementation manner of the second aspect, in a third possible implementation manner, the response unit is further configured to, if the data status identifier of the first data in the first storage node is the undefined identifier, forward the reading message to the destination control node of the first data in the first storage node, so that when a data status identifier of the first data in a connected destination storage node is a valid identifier, the destination control node reads the first data from the destination storage node and sends the read first data to the data switching device, and the data switching device forwards the read first data to the second control node.

With reference to the third possible implementation manner of the second aspect, in a fourth possible implementation manner, that the response unit is further configured to forward the reading message to the destination control node of the first data in the first storage node may comprise the response unit is configured to obtain information about the destination control node of the first data in the first storage node, generate, according to the information about the destination control node, a unicast instruction directed to the destination control node, and send the reading message that carries the unicast instruction to the data switching device, so that the data switching device unicasts the reading message to the destination control node when the unicast instruction is detected.

With reference to the third possible implementation manner of the second aspect or the fourth possible implementation manner of the second aspect, in a fifth possible implementation manner, the response unit is further configured to, when receiving a notification message forwarded by the data switching device, set the data status identifier of the first data in the first storage node from the undefined identifier to an invalid identifier, where the invalid identifier indicates that the first data in the first storage node is unavailable; where the notification message is sent by the destination control node to the data switching device when the following condition is met, after receiving the first data sent by the first control node and caching the first data into the destination storage node, the destination control node sets the data status identifier of the first data in the destination storage node to the valid identifier.

With reference to the second aspect or any one of the foregoing possible implementation manners of the second aspect, in a sixth possible implementation manner, a condition for which the reading message is sent by the second control node to the data switching device includes the second control node needs to write updated first data to the connected second storage node, and the data status identifier of the first data in the second storage node is not the valid identifier.

With reference to the sixth possible implementation manner of the second aspect, in a seventh possible implementation manner, a condition for which the reading message is sent by the second control node to the data switching device is the second control node receives a write-back message; where storage nodes in the node group include a memory node that is in the multiprocessor network and stores the first data, and a cache node that is in the multiprocessor network and is configured to store mirrored data of the first data; control nodes in the node group include a processor node bus-connected to the cache node in the node group, and a controller connected to the memory node; the second control node is a controller in the node group, and the first control node is a processor node, in the node group, that sends the write-back message; the write-back message is sent by the processor node in the node group to the controller in the node group by means of the data switching device when the data status identifier of the first data in the bus-connected cache node is the valid identifier and the first data needs to be written back to the memory node in the node group.

According to a third aspect, the embodiments of the present application provide a first control node, the first control node includes a processor, a memory, and a network interface, and the processor is connected to the memory and the network interface using a bus; and the memory is configured to store a computer-executable instruction, and when the first control node runs, the processor reads the computer-executable instruction stored in the memory to execute the data reading method according to the first aspect or any possible implementation manner of the first aspect.

According to a fourth aspect, the embodiments of the present application provide a data processing system, where the data processing system is applied to a multiprocessor network, where the data processing system includes a storage node that is in the multiprocessor network and that stores first data, a control node connected to the storage node, and one or more data switching devices, where each two control nodes are communicatively connected using the data switching device; a node group includes a storage node in the data processing system and a control node in the data processing system, a maximum of one storage node in the node group stores the first data whose data status identifier is a valid identifier, and the data status identifier of the first data stored in the storage node in the node group is reset to the valid identifier when the storage node in the node group stores available first data; the control node is configured to exercise read/write control on the connected storage node, including setting a data status identifier for the first data stored in the connected storage node; a first control node is a control node in the node group, a first storage node is a storage node that is in the node group and that is connected to the first control node; a second control node is a control node in the node group, and a second storage node is a storage node that is in the node group and that is connected to the second control node; the second control node is configured to send a reading message to the data switching device, where the reading message is used to instruct to read the first data; the data switching device is configured to, when receiving the reading message sent by the second control node, forward the reading message to other control nodes other than the second control node in the node group; the first control node is configured to, when receiving the reading message forwarded by the data switching device, if the data status identifier of the first data in the first storage node is the valid identifier, read the first data from the first storage node, reset the data status identifier of the first data in the first storage node from the valid identifier to an undefined identifier, record a destination control node of the first data in the first storage node as the second control node, and send the read first data to the data switching device, where the valid identifier indicates that the first data on the first storage node is available, and the undefined identifier indicates that the destination control node provides currently latest first data; and the data switching device is further configured to forward the read first data to the second control node.

With reference to the fourth aspect, in a first possible implementation manner, that the data switching device is configured to, when receiving the reading message sent by the second control node, forward the reading message to other control nodes other than the second control node in the node group may comprise the data switching device is configured to receive the reading message that is sent by the second control node and carries a multicast instruction, and multicast the reading message to the other control nodes other than the second control node in the node group when the read instruction is detected.

With reference to the fourth aspect or the first possible implementation manner of the fourth aspect, in a second possible implementation manner, the second control node is further configured to, after receiving the first data sent by the first control node and caching the first data into the second storage node, set a data status identifier of the first data in the second storage node to the valid identifier, and send a notification message directed to the first control node to the data switching device; the data switching device is further configured to forward the notification message to the first control node; and the first control node is further configured to, when receiving the notification message forwarded by the data switching device, set the data status identifier of the first data in the first storage node from the undefined identifier to an invalid identifier, where the invalid identifier indicates that the first data in the first storage node is unavailable.

With reference to the fourth aspect or the first possible implementation manner of the fourth aspect, in a third possible implementation manner, the first control node is further configured to, when receiving the reading message forwarded by the data switching device, if the data status identifier of the first data in the first storage node is the undefined identifier, forward the reading message to the destination control node of the first data in the first storage node, so that when a data status identifier of the first data in a connected destination storage node is a valid identifier, the destination control node reads the first data from the destination storage node and sends the read first data to the data switching device, and the data switching device forwards the read first data to the second control node.

With reference to the third possible implementation manner of the fourth aspect, in a fourth possible implementation manner, that the first control node is configured to forward the reading message to the destination control node of the first data in the first storage node includes the first control node is configured to obtain information about the destination control node of the first data in the first storage node, generate, according to the information about the destination control node, a unicast instruction directed to the destination control node, and send the reading message that carries the unicast instruction to the data switching device, so that the data switching device unicasts the reading message to the destination control node when the unicast instruction is detected and the unicast instruction is directed to the destination control node.

With reference to the third possible implementation manner of the fourth aspect or the fourth possible implementation manner of the fourth aspect, in a fifth possible implementation manner, the first control node is further configured to, when receiving the notification message forwarded by the data switching device, set the data status identifier of the first data in the first storage node from the undefined identifier to an invalid identifier, where the invalid identifier indicates that the first data in the first storage node is unavailable; where the notification message is sent by the destination control node to the data switching device when the following condition is met, after receiving the first data sent by the first control node and caching the first data into the destination storage node, the destination control node sets the data status identifier of the first data in the destination storage node to the valid identifier.

With reference to the fourth aspect or any one of the foregoing possible implementation manners of the fourth aspect, in a sixth possible implementation manner, a condition for which the reading message is sent by the second control node to the data switching device includes the second control node needs to write updated first data to the connected second storage node, and the data status identifier of the first data in the second storage node is not the valid identifier.

With reference to the fourth aspect, in a seventh possible implementation manner, a condition for which the reading message is sent by the second control node to the data switching device is the second control node receives a write-back message; where storage nodes in the node group include a memory node that is in the multiprocessor network and stores the first data, and a cache node that is in the multiprocessor network and is configured to store mirrored data of the first data; control nodes in the node group include a processor node bus-connected to the cache node in the node group, and a controller connected to the memory node; the second control node is a controller in the node group, and the first control node is a processor node, in the node group, that sends the write-back message; the write-back message is sent by the processor node in the node group to the controller in the node group by means of the data switching device when the data status identifier of the first data in the bus-connected cache node is the valid identifier and the first data needs to be written back to the memory node in the node group.

According to the foregoing solutions, in a multiprocessor network, a data status identifier is set for first data stored in each storage node that is configured to store the first data, and a control node connected to the storage node manages the data status identifier to ensure data consistency of the first data, so that the first data that is read by means of message exchange between control nodes in a node group is currently the latest.

DESCRIPTION OF EMBODIMENTS

Figure 1A:
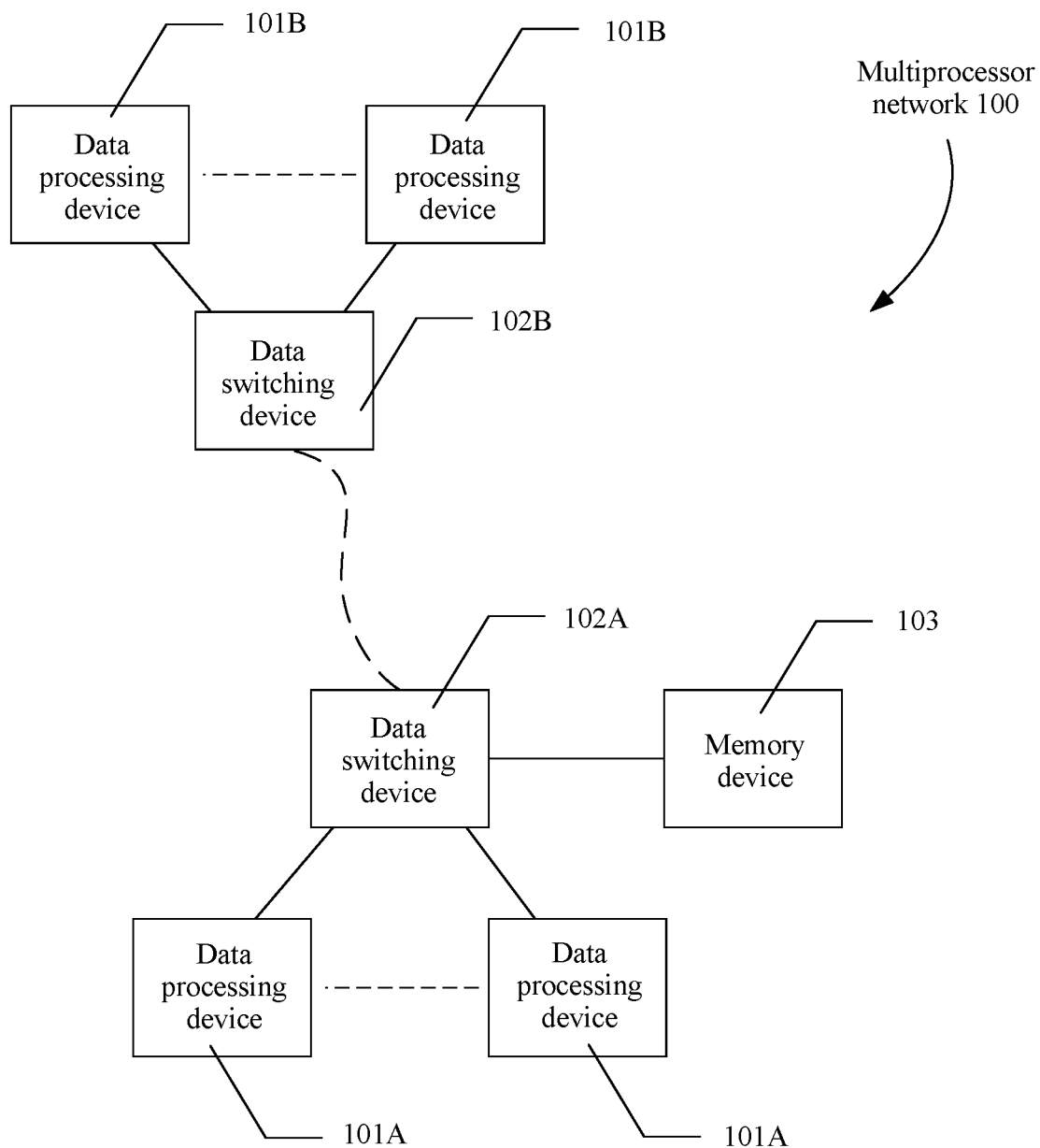
FIG. 1A is a schematic structural diagram of a network topology of an application scenario of a data reading method.

The following clearly describes the technical solutions in the embodiments of the present application with reference to the accompanying drawings in the embodiments of the present application.

The following definitions are provided. That a storage node has a valid identifier means that a data status identifier of first data in the storage node is a valid identifier; that a storage node has an undefined identifier means that a data status identifier of first data in the storage node is an undefined identifier; and that a storage node has an invalid identifier means that a data status identifier of first data in the storage node is an invalid identifier. The following detailed definitions are provided: That a cache node has a valid identifier means that a data status identifier of first data in the cache node is a valid identifier; that a cache node has an undefined identifier means that a data status identifier of first data in the cache node is an undefined identifier; and that a cache node has an invalid identifier means that a data status identifier of first data in the cache node is an invalid identifier. The following detailed definitions are provided: That a memory node has a valid identifier means that a data status identifier of first data in the memory node is a valid identifier; that a memory node has an undefined identifier means that a data status identifier of first data in the memory node is an undefined identifier; and that a memory node has an invalid identifier means that a data status identifier of first data in the memory node is an invalid identifier. The following detailed definitions are provided: That a first storage node has a valid identifier means that a data status identifier of first data in the first storage node is a valid identifier; that a first storage node has an undefined identifier means that a data status identifier of first data in the first storage node is an undefined identifier; and that a first storage node has an invalid identifier means that a data status identifier of first data in the first storage node is an invalid identifier. The following detailed definitions are provided: That a second storage node has a valid identifier means that a data status identifier of first data in the second storage node is a valid identifier; that a second storage node has an undefined identifier means that a data status identifier of first data in the second storage node is an undefined identifier; and that a second storage node has an invalid identifier means that a data status identifier of first data in the second storage node is an invalid identifier. The following detailed definitions are provided: That a destination storage node has a valid identifier means that a data status identifier of first data in the destination storage node is a valid identifier; that a destination storage node has an undefined identifier means that a data status identifier of first data in the destination storage node is an undefined identifier; and that a destination storage node has an invalid identifier means that a data status identifier of first data in the destination storage node is an invalid identifier.

Referring to a multiprocessor network 100 shown in FIG. 1A, the multiprocessor network 100 includes multiple data processing devices (including a data processing device 101A and a data processing device 101B), one or more data switching devices (including a data switching device 102A and a data switching device 102B), and one or more memory devices 103. Each data processing device may include one or more processor nodes, and processor nodes included in the multiprocessor network 100 implement data transmission with each other by means of message exchange. During processing of a service, a process of the service may be migrated between the processor nodes included in the multiprocessor network 100. There are one or more data processing devices 101A. The data processing device 101A is communicatively connected to the data switching device 102A. The data processing device 101A exchanges data with the data switching device 102A using a message, and the message needs to be forwarded by the data switching device 102A to implement message exchange between two data processing devices 101A. Similarly, there are one or more data processing devices 101B. The data processing device 101B is communicatively connected to the data switching device 102B. The data processing device 101B exchanges data with the data switching device 102B using a message, and the message needs to be forwarded by the data switching device 102A to implement message exchange between two data processing devices 101B. If the data processing device 101A exchanges data with the data switching device 101B using a message, the message needs to be forwarded by the data switching device 102A and the data switching device 102B.

It should be noted that a quantity of data processing devices (including a data processing device 101A and a data processing device 101B) included in the multiprocessor network 100 shown in FIG. 1A is merely an example. In specific implementation, the quantity of data processing devices may be increased or decreased according to requirements. However, at least two data processing devices are included in the multiprocessor network 100.

Figure 1B:
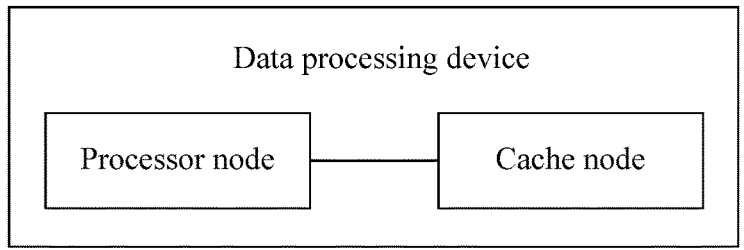
FIG. 1B is a schematic diagram of a logical structure of a data processing device in FIG. 1A.

As shown in FIG. 1B, the data processing device includes a processor node (namely, a CPU) and a cache node (namely, a Cache). The processor node and the cache node in the data processing device are connected using a bus. If the data processing device includes one processor node and one cache node, the one processor node is bus-connected to the one cache node in the data processing device. If the data processing device includes multiple processor nodes and multiple cache nodes, and a quantity of the processor nodes is the same as a quantity of the cache nodes, all the processor nodes are connected to all the cache nodes in the data processing device one-to-one using buses. For a processor node and a cache node that are bus-connected in the data processing device, the processor node is capable of reading data from the cache node and writing data to the cache node. However, the embodiments of the present application do not limit a specific implementation form of the data processing device, for example, electronic devices that form the data processing device, and a quantity of data bits supported by the data processing device. For example, the data processing device in the multiprocessor network 100 may be a normal computer, a mobile terminal, a workstation or a server, or a dedicated server or the like, such as an X86 processor.

Data stored in the cache node of the data processing device is accessed and managed by the processor node bus-connected to the cache node. For example, the processor node may cache first data into the cache node, and set a data status identifier for the first data in the cache node according to whether the first data cached in the cache node is currently the latest. If the first data cached in the cache node is not currently the latest, an invalid identifier is set for the data status identifier of the first data in the cache node. If the first data cached in the cache node is currently the latest, and the processor node does not send the first data cached in the cache node to other processor nodes, a valid identifier is set for the data status identifier of the first data in the cache node. If the first data cached in the cache node is currently the latest, and the processor node is sending the first data cached in the cache node to other processor nodes, an undefined identifier is set for the data status identifier of the first data in the cache node.

In addition, a processor node in a data processing device is communicatively connected to a data switching device, so that each two processor nodes in the multiprocessor network 100 may perform message exchange using the data switching device. In a process of message exchange between each two processor nodes, the data switching device performs message forwarding between each two processor nodes. For example, a processor node reads first data from a cache node bus-connected to the processor node, adds the read first data into a message, and adds a destination address into the message. The destination address is directed to a processor node to which the message is expected to be sent. The processor node sends the message to a data switching device. According to the destination address recorded in the message, the data switching device forwards the message to the processor node to which the destination address is directed. The processor node to which the destination address is directed parses the message to obtain the first data. Transmission of the message that carries the first data is completed between each two processor nodes using the data switching device.

For another example, a processor node in the data processing device 101A triggers a reading message that carries a unicast instruction, and sends the reading message to the data forwarding device 102A. The data forwarding device 102A detects the unicast instruction from the reading message. Assuming that the unicast instruction specifies a processor node in the data processing device 101B, the data forwarding device 102A forwards the reading message to the data forwarding device 102B, and the data forwarding device 102B forwards the reading message to the processor node in the data processing device 101B.

The multiprocessor network 100 shown in FIG. 1A includes the data switching device 102A and the data switching device 102B. The data switching device 102A is communicatively connected to the data switching device 102B. Optionally, the data switching device 102A and the data switching device 102B may belong to a same local area network (LAN). Optionally, the data switching device 102A and the data switching device 102B belong to different local area networks, and a communication connection is established between the data switching device 102A and the data switching device 102B using the Ethernet. By analogy, all data switching devices in the multiprocessor network 100 may be located in a same local area network; or all data switching devices in the multiprocessor network 100 belong to multiple local area networks, and the data switching devices that do not belong to a same local area network are connected using the Ethernet. The communication connection between the data switching devices ensures message exchange between each two processor nodes in the multiprocessor network 100. In an optional implementation manner, the data switching device is implemented using a switch. Message exchange between each two processor nodes is performed using the switch.

It should be noted that a quantity of data switching devices (including a data switching device 102A and a data switching device 102B) included in the multiprocessor network 100 shown in FIG. 1A is merely an example. In specific implementation, the multiprocessor network 100 may include one or more data switching devices. A specific quantity of data switching devices used in the multiprocessor network 100 depends on requirements. For example, in FIG. 1A, the multiprocessor network 100 may include only the data switching device 102A in FIG. 1A and multiple data processing devices 101A in FIG. 1A, and does not include the data switching device 102B and the data processing devices 101B in FIG. 1A. The data switching device 102A forwards a message exchanged between processor nodes in the multiple data processing devices 101A.

It should be noted that a path of message forwarding between each two processor nodes in data switching devices may include one or more data switching devices, that is, message forwarding between each two processor nodes needs to be completed by means of one or more data switching devices. For example, in FIG. 1A, in the multiprocessor network 100, in a process in which a processor node in the data processing device 101A sends a message to a processor node in the data processing device 101B, the processor node in the data processing device 101A first sends a message to the data switching device 102A, and then the data switching device 102A forwards the message to the data switching device 102B when recognizing that the message is expected to be sent to the processor node in the data processing device 101B. Finally, the data switching device 102B sends the message to the processor node in the data processing device 101B.

Optionally, for each data switching device included in the multiprocessor network 100, a maximum quantity of processor nodes that are allowed to directly communicatively connect to the data switching device is generally definite. With increase of the quantity of the processor nodes in the multiprocessor network 100, the quantity of data switching devices needs to be increased. Communication connections are established between added data switching devices and multiple added processor nodes. In the multiprocessor network 100, communication connections are established between the added data switching devices and original data switching devices. In this way, the quantity of processor nodes in the multiprocessor network 100 is expanded by increasing the data switching devices. Because each processor node is connected to a cache node correspondingly, a quantity of cache nodes in the multiprocessor network 100 can be expanded by increasing the data switching devices.

Referring to the multiprocessor network 100 shown in FIG. 1A, the multiprocessor network 100 further includes a memory device 103. The memory device 103 is communicatively connected to the data switching device 102A. It should be noted that a communication connection between the memory device 103 and the data switching device 102A is merely an example. For example, the memory device 103 may also be communicatively connected to the data switching device 102B. By analogy, a data switching device or data switching devices connected to the memory device are not limited.

Figure 1C:
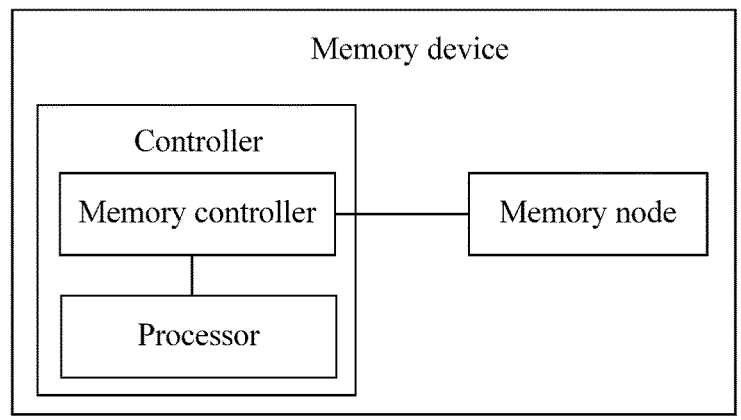
FIG. 1C is a schematic diagram of a logical structure of a memory device in FIG. 1A.

Referring to FIG. 1C, the memory device included in the multiprocessor network 100 refers to a hardware device that has a storage function. The memory device includes a controller and a memory node. The controller includes a processor and a memory controller. Optionally, in the memory device, the processor is directly electrically connected to the memory controller; optionally, in the memory device, the processor is bus-connected to the memory controller. Optionally, in the memory device, the memory controller is directly electrically connected to the memory node; optionally, in the memory device, the memory controller is bus-connected to the memory node.

The memory node is configured to store data. The processor in the memory device controls the memory controller to read or write data in the memory node. For example, after the memory node caches first data, the processor sets a data status identifier for the first data in the memory node according to whether the first data stored in the memory node is currently the latest. If the first data stored in the memory node is currently the latest, and the controller does not send the first data stored in the memory node to a processor node, the memory node has a valid identifier (when writing data to the memory node to update the first data stored in the memory node to the latest data, the processor controls the memory controller to set the data status identifier of the first data in the memory node to a valid identifier). If the first data stored in the memory node is currently the latest, and the controller is sending the first data stored in the memory node to a processor node, the processor controls the memory controller to set the data status identifier of the first data in the memory node to an undefined identifier. The processor node successively completes the following operations: receiving the first data from the controller, caching the first data into a cache node bus-connected to the processor node, and sending a notification message to the controller when the data status identifier of the first data in the cache node bus-connected to the processor node is changed from an invalid identifier to a valid identifier. When receiving the notification message, the processor of the controller controls the memory controller to change the data status identifier of the first data in the memory data from the undefined identifier to an invalid identifier. Therefore, if the first data stored in the memory node is not currently the latest, the data status identifier of the first data in the memory node is an invalid identifier. If the first data stored in the memory node is currently the latest, the data status identifier of the first data in the memory node may be a valid identifier or an undefined identifier.

The processor included in the controller of the memory device is configured to perform message exchange with a processor node in the multiprocessor network 100 by means of a data switching device. For example, a processor node in a node group sends a reading message to a controller in a memory device, and the processor in the controller receives the reading message, responds to the reading message, and successively performs the following operations: controlling a memory controller to read the first data from a memory node, and feeding back the read first data using a message to the processor node, in the node group, that sends the reading message.

The memory controller included in the controller of the memory device is configured to perform a read operation/write operation on the memory node under control of the processor of the memory device.

It should be noted that the controller (which is implemented using the processor included in the controller) in the memory device may perform message exchange with the processor node in the data processing device by means of the data switching device. By means of the message exchange, the processor node in the data processing device receives the data that is read by the controller of the memory device from the memory node, temporarily stores the read data into the cache node in the data processing device, and completes mirroring the data stored in the memory node into the cache node. In this way, the processor node can access, at a high speed using a bus, the mirrored data stored in the cache node, without needing to access the data in the memory. By analogy, for data that a processor node in the multiprocessor network 100 expects to process, all the data stored in a memory node is mirrored beforehand, and the mirrored data is temporarily stored into a cache node bus-connected to the processor node.

Optionally, to increase a speed of obtaining data from the memory by the processor node, a shared memory is used as the memory device. The shared memory refers to a memory pool formed by decoupled memories after processors are decoupled from the memories. Each processor node can access the shared memory by means of the data switching device, including the processor node performs message exchange with a controller of the shared memory, to receive the data that is read by the controller of the shared memory from a memory node of the shared memory; and the processor node performs message exchange with the controller of the shared memory to send data to the controller of the shared memory using an exchanged message, so that the data is written.

In the embodiments of the present application, when multiple processor nodes in the multiprocessor network 100 expect to access first data, each processor node performs message communication with the controller of the memory device by means of a data forwarding device, to mirror the first data stored in the memory node and cache the mirrored first data into a cache node bus-connected to the processor node. To implement cache coherence of the first data stored in the cache node included in the multiprocessor network 100, or to implement data consistency of the first data stored in the cache node and the memory node that are included in the multiprocessor network 100, a data reading method is provided.

To implement the data reading method, a node group corresponding to the first data is established and determined beforehand. The node group includes two types of nodes: a control node and a storage node.

Optionally, to implement cache coherence of the first data in the multiprocessor network 100, a processor node that expects to process the first data in the multiprocessor network 100 is added into the node group. The added processor node is a control node. Correspondingly, when the processor node in the node group expects to process the first data, the processor node reads the first data from the memory device that stores the first data, and stores the read first data into a cache node bus-connected to the process node (mirrors the first data stored in the memory device). Therefore, the cache node bus-connected to the processor node in the node group is also added into the node group. The added cache node is a storage node.

Optionally, to implement data consistency of the first data in the multiprocessor network 100, a processor node that expects to process the first data in the multiprocessor network 100 is added into the node group as a control node, and a cache node bus-connected to the processor node in the node group is added into the node group as a storage node. In addition, a memory node that is in the multiprocessor network 100 and stores the first data is added into the node group, and the added memory node is a storage node; a controller that is in the memory device and is connected to the memory node is added into the node group, and the added controller is a control node.

It may be learned that the two types of nodes included in the node group are both related to the first data. Therefore, a processor node that does not expect to process the first data in the multiprocessor network 100 does not belong to the node group. Correspondingly, a cache node that does not cache the first data (namely, a cache node bus-connected to the processor node that does not expect to process the first data) does not belong to the node group. In the multiprocessor network 100, a controller and a memory node that are included in a memory device that does not store the first data do not belong to the node group.

In the node group, the control node may perform read/write access to the first data in the storage node connected to the control node, including setting an identifier for the data status identifier of the first data in the storage node. The data status identifier may be set to a valid identifier, an invalid identifier, or an undefined identifier. It should be emphasized that in the embodiments of the present application, a maximum of one storage node in the node group has a valid identifier. When the currently latest first data is stored in the storage node in the node group, the data status identifier of the first data in the storage node is set to the valid identifier.

In an embodiment of the present application, a node group described in this embodiment may be a node group that is established to implement cache coherence of first data. Storage nodes in the node group include a cache node that is in the multiprocessor network 100 and that caches the first data, and control nodes in the node group include a processor node that is in the multiprocessor network 100 and that is bus-connected to the cache node. Alternatively, a node group described in this embodiment may be a node group that is established to implement data consistency of first data. Storage nodes in the node group include a cache node that is in the multiprocessor network 100 and that caches the first data, and a memory node that is in a memory device and that stores the first data; and control nodes in the node group include a processor node bus-connected to the cache node in the node group in the multiprocessor network 100, and a controller connected to the memory node in the node group.

It is predefined that the control node in the node group includes a second control node, and the storage node in the node group includes a second storage node bus-connected to the second control node; and other control nodes other than the second control node in the node group include a first control node, and a first storage node is a storage node that is in the node group and that is connected to the first control node. After the node group is established, it is assumed that the first storage node (not the second storage node) in the node group has a valid identifier, and all other storage nodes other than the first storage node in the node group have invalid identifiers. That is, in a process in which the second control node reads currently the latest first data from the node group, all other control nodes other than the second control node in the node group do not simultaneously read the currently latest first data from the node group. All other control nodes other than the second control node in the node group do not simultaneously trigger a reading message to read the currently latest first data from the node group. Based on the foregoing assumption, using an example in which the second control node expects to read the first data, the following elaborates on an implementation procedure of a data reading method provided in this embodiment of the present application. The implementation procedure successively includes step S101, step S102, step S103, step S104, step S105, step S106, and step S107.

A node table is established and stored in the data switching device beforehand. The node table records an address of each control node in the node group, and route information required for sending a message to each control node. The route information records a route for sending the message to each control node. In this way, when the message is exchanged between multiple control nodes by means of the data switching device, the data switching device searches the stored node table for the route information required for sending the message to the control node.

Step S101: When a second control node expects to read first data, if a second storage node (the second storage node is defined as a cache node bus-connected to the second control node) connected to the second control node has an invalid identifier, the second control node triggers a reading message. The reading message carries a multicast instruction, and the multicast instruction instructs to forward the reading message to other control nodes other than the second control node. The second control node sends the reading message that carries the multicast instruction to a data switching device. In this case, an identifier of each storage node in the node group is as follows. The first storage node (not the second storage node connected to the second control node) has a valid identifier; all other storage nodes other than the first storage node with the valid identifier, including the second storage node connected to the second control node, have invalid identifiers.

Step S102: The data switching device receives the reading message, and when detecting the multicast instruction in the received reading message, searches a node table for route information required for expecting to forward the reading message to the other control nodes other than the second control node, and multicasts the reading message to the other control nodes other than the second control node according to the found route information.

Step S103: When receiving the multicast reading message, another control node other than the second control node detects whether a data status identifier of the first data in a storage node bus-connected to the control node is a valid identifier. The first control node is used as an example. If the first control node detects that the first storage node has a valid identifier, the first control node reads the first data (namely, data specified by the reading message) from the first storage node, and sends a response message to the data switching device, so that the read first data is fed back to the second control node by means of the data switching device. The response message carries the first data that is read from the first storage node. The first control node changes the data status identifier of the first data in the first storage node from the valid identifier to an undefined identifier when the first control node starts to send the response message to the second control node. In a process in which the first control node sends the response message to the second control node by means of the data switching device, the first storage node has an undefined identifier, and all storage nodes except the first storage node with an undefined identifier in the node group have invalid identifiers.

Step S104: The data switching device receives the response message, searches the node table for route information required for forwarding the response message to the second control node, and forwards the response message to the second control node according to the found route information.

Step S105: The second control node receives the response message, parses the response message to obtain the first data that is read from the first storage node, writes the obtained first data to the second storage node, and changes the data status identifier of the first data in the second storage node from an invalid identifier to a valid identifier. The second control node feeds back a notification message to the first control node when completing changing the data status identifier of the first data in the second storage node (from an invalid identifier to a valid identifier). In a process in which the second control node sends the notification message to the first control node by means of the data switching device, the second storage node has a valid identifier, the first storage node has an undefined identifier, and all storage nodes, except the cache node with a valid identifier and the first storage node with an undefined identifier, in the node group have invalid identifiers.

Step S106: The data switching device receives the notification message, searches the node table for route information required for forwarding the notification message to the first control node, and forwards the notification message to the first control node according to the found route information.

Step S107: When receiving the notification message, the first control node changes the data status identifier of the first data in the first storage node from the undefined identifier to an invalid identifier. In this case, an identifier of each storage node in the node group is as follows. The second storage node has the valid identifier, and all other storage nodes other than the cache node with the valid identifier in the storage nodes, including the first storage node, have invalid identifiers.

In an embodiment of the present application, a node group described in this embodiment may be a node group that is established to implement cache coherence of first data. Storage nodes in the node group include a cache node that is in the multiprocessor network 100 and that caches the first data, and control nodes in the node group include a processor node that is in the multiprocessor network 100 and that is bus-connected to the cache node. Alternatively, a node group described in this embodiment may be a node group that is established to implement data consistency of first data. Storage nodes in the node group include a cache node that is in the multiprocessor network 100 and that caches the first data, and a memory node that is in the memory device and that stores the first data; and control nodes in the node group include a processor node bus-connected to the cache node in the node group in the multiprocessor network 100, and a controller connected to the memory node in the node group.

It is assumed that in a process in which a second control node reads the currently latest first data from the node group, a control node other than the second control node in the node group is performing message exchange with a first control node to obtain the currently latest first data from the first control node. Therefore, a first storage node in the node group has an undefined identifier, and all other storage nodes, other than the first storage node, in the node group have invalid identifiers. Based on the foregoing assumption, using an example in which the second control node expects to read the first data, the following elaborates on an implementation procedure of a data reading method provided in this embodiment of the present application. The implementation procedure successively includes step S201, step S202, step S203, step S204, step S205, step S206, and step S207.

It should be noted that a catalog is established on each storage node beforehand. The catalog records a data status identifier of first data in the storage node, an address of first data stored in a memory node, and an address of a destination control node. The data status identifier of the first data in the storage node may be any one of the following: a valid identifier, an invalid identifier, or an undefined identifier. The first storage node is used as an example. When a control node performs message exchange with the first control node to obtain the first data from the first storage node that stores the currently latest first data, the control node is used as a destination control node, and an address of the destination control node is updated to an address of this control node in the catalog of the first storage node. In addition, when a control node performs message exchange with the first control node to obtain the first data from the first storage node, the first control node sets the data status identifier of the first data in the first storage node to an undefined identifier. By analogy, for another control node other than the first control node, when the another control node performs message exchange with the first control node to obtain the first data from the first storage node, the another control node is used as a destination control node, and an address, of the destination control node, recorded in a catalog of the storage node is updated to an address of the another control node. In addition, when the another control node performs message exchange with the first control node to obtain the first data from the first storage node, the first control node sets the data status identifier of the first data in the first storage node to an undefined identifier.

Step S201: When a second control node expects to read first data, if a second storage node connected to the second control node has an invalid identifier, the second control node triggers a reading message. The reading message carries a multicast instruction, and the multicast instruction instructs to forward the reading message to other control nodes other than the second control node. The second control node sends the reading message that carries the multicast instruction to a data switching device. In this case, an identifier of each storage node in the node group is as follows. The first storage node (not the second storage node) has an undefined identifier; all other storage nodes other than the first storage node with the undefined identifier, including the second storage node, have invalid identifiers.

Step S202: The data switching device receives the reading message, and when detecting the multicast instruction in the received reading message, searches a node table for route information required for expecting to forward the reading message to the other control nodes other than the second control node, and multicasts the reading message to the other control nodes other than the second control node according to the found route information.

Step S203: When receiving the multicast reading message, another control node other than the second control node detects whether an identifier of a storage node bus-connected to the control node is a valid identifier or an undefined identifier. When detecting that the first storage node has an undefined identifier, the first control node triggers a reading message. The reading message carries a unicast instruction. The first control node searches for the address of the destination control node recorded in the catalog of the first storage node, and by means of the data forwarding device, sends the reading message that carries the unicast instruction to the destination control node according to the address of the destination control node.

Step S204: The data switching device receives the reading message, and when detecting the unicast instruction from the received reading message, searches the node table for route information required for expecting to forwarding the reading message to the destination control node, and unicasts the reading message to the destination control node according to the found route information.

Step S205: When receiving the unicast reading message, the destination control node waits to successively complete the following operations: receiving the first data from the first control node, caching the first data into the destination storage node, and setting a data status identifier of the first data in the destination storage node from an invalid identifier to a valid identifier; and when setting the data status identifier of the first data in the destination storage node from an invalid identifier to a valid identifier, feeds back a notification message to the first control node by means of the data switching device. Only after feeding back the notification message to the first control node, the destination control node responds to the reading message, reads data (namely, the first data) specified by the message from the destination storage node, and generates a response message, where the response message carries the data specified by the reading message. The destination control node feeds back the response message to the second control node by means of the data switching device, and changes the data status identifier of the first data in the destination storage node from a valid identifier to an undefined identifier when starting to send the response message. In this case, in a process in which the destination control node sends the notification message to the first control node by means of the data switching device, the destination storage node has the valid identifier, the first storage node has the undefined identifier, and all storage nodes, except the destination storage node with a valid identifier and the first storage node with an undefined identifier, in the node group have invalid identifiers. In a process in which the destination control node sends the response message to the second control node by means of the data switching device, the destination storage node has an undefined identifier, and all storage nodes, except the first storage node and the destination storage node, in the node group have invalid identifiers.

Step S205: The data switching device successively receives the notification message and the response message; searches the node table for route information required for forwarding the notification message to the first control node, and forwards the notification message to the first control node according to the found route information; and searches the node table for route information required for forwarding the response message to the second control node, and forwards the response message to the second control node according to the found route information.

Step S206: The first control node changes the data status identifier of the first data in the first storage node from an undefined identifier to an invalid identifier when receiving the notification message sent by the destination control node.

Step S207: When receiving the response message, the second control node parses the response message to obtain the first data that is read from the destination storage node, caches the obtained first data into the second storage node, and when completing caching the first data, changes the data status identifier of the first data in the second storage node (from an invalid identifier to a valid identifier). The second control node feeds back a notification message to the destination control node when completing changing the data status identifier of the first data in the second storage node (from an invalid identifier to a valid identifier). In a process in which the second control node sends the notification message to the destination control node by means of the data switching device, the second storage node has a valid identifier, the destination storage node has an undefined identifier, and all storage nodes, except the second storage node with a valid identifier and the destination storage node with an undefined identifier, in the node group have invalid identifiers.

Step S208: The data switching device receives the notification message, searches the node table for route information required for forwarding the notification message to the destination control node, and forwards the notification message to the destination control node according to the found route information.

Step S209: When receiving the notification message, the destination control node changes the data status identifier of the first data in the destination storage node from an undefined identifier to an invalid identifier. In this case, the identifier of each storage node in the node group is as follows The second storage node has a valid identifier, and all other storage nodes, other than the second storage node with the valid identifier, in the storage nodes, including the destination storage node, have invalid identifiers.

In an embodiment of the present application, a node group described in this embodiment may be a node group that is established to implement cache coherence of first data. Storage nodes in the node group include a cache node that is in the multiprocessor network 100 and that caches the first data, and control nodes in the node group include a processor node that is in the multiprocessor network 100 and that is bus-connected to the cache node. Alternatively, a node group described in this embodiment may be a node group that is established to implement data consistency of first data. Storage nodes in the node group include a cache node that is in the multiprocessor network 100 and that caches the first data, and a memory node that is in the memory device and that stores the first data; and control nodes in the node group include a processor node bus-connected to the cache node in the node group in the multiprocessor network 100, and a controller connected to the memory node in the node group.

It is assumed that in a process in which a second control node reads the currently latest first data from the node group, a control node other than the second control node in the node group is performing message exchange with the second control node to obtain the currently latest first data from the second control node. Therefore, a second storage node in the node group has an undefined identifier, and all other storage nodes, other than the second storage node, in the node group have invalid identifiers. Based on the foregoing assumption, using an example in which the second control node expects to read the first data, the following elaborates on an implementation procedure of a data reading method provided in this embodiment of the present application. The implementation procedure successively includes step S301, step S302, step S303, step S304, step S305, step S306, and step S307.

It should be noted that a catalog is established on each storage node beforehand. The catalog records a data status identifier of first data in the storage node, an address of first data stored in a memory node, and an address of a destination control node. The data status identifier of the first data in the storage node may be any one of the following: a valid identifier, an invalid identifier, or an undefined identifier. The second storage node is used as an example. When a control node performs message exchange with the second control node to obtain the first data from the second storage node that stores the currently latest first data, the control node is used as a destination control node, and an address of the destination control node is updated to an address of this control node in the catalog of the second storage node. In addition, when a control node performs message exchange with the second control node to obtain the first data from the second storage node, the second control node sets the data status identifier of the first data in the second storage node to an undefined identifier. By analogy, for each storage node, when another control node performs message exchange with a control node connected to the storage node to obtain the first data from the storage node, the another control node is used as a destination control node, and an address of the destination control node recorded in the catalog of the storage node is updated to an address of the another control node. In addition, when the another control node performs message exchange with the control node to obtain the first data from the storage node, the control node sets the data status identifier of the first data in the storage node connected to the control node to an undefined identifier.

Step S301: When a second control node expects to read first data, if a second storage node has an undefined identifier, the second control node triggers a reading message, where the reading message carries a unicast instruction; searches for an address of a destination control node recorded in a catalog of the second storage node, and by means of a data forwarding device; and sends the reading message to the destination control node according to the address of the destination control node. In this case, an identifier of each storage node in the node group is as follows. The second storage node has an undefined identifier; and if the destination control node has not completed receiving the first data, all other storage nodes, other than the second storage node, in the node group have invalid identifiers.

Step S302: The data switching device receives the reading message, and when detecting the unicast instruction in the received reading message, searches a node table for route information required for expecting to forward the reading message to the destination control node, and unicasts the reading message to the destination control node according to the found route information.

Step S303: When receiving the unicast reading message, the destination control node waits to successively complete the following operations: receiving the first data from the second control node, caching the first data into the destination storage node, and setting a data status identifier of the first data in the destination storage node from an invalid identifier to a valid identifier, and the destination control node updates the first data in the destination storage node; and when setting the data status identifier of the first data in the destination storage node from an invalid identifier to a valid identifier, feeds back a notification message to the second control node by means of the data switching device. Only after feeding back the notification message to the second control node, the destination control node responds to the reading message of the second control node, reads data (namely, the updated first data) specified by the message from the destination storage node, and generates a response message, where the response message carries the data specified by the reading message. The destination control node feeds back the response message to the second control node by means of the data switching device, and changes the data status identifier of the first data in the destination storage node from a valid identifier to an undefined identifier when starting to send the response message. In this case, in a process in which the destination control node sends the notification message to the second control node by means of the data switching device, the destination storage node has a valid identifier, the second storage node has an undefined identifier, and all storage nodes, except the destination storage node with a valid identifier and the second storage node with an undefined identifier, in the node group have invalid identifiers. In a process in which the destination control node sends the response message to the second control node by means of the data switching device, the destination storage node has an undefined identifier, the second storage node has an undefined identifier, and all storage nodes, except the destination storage node with an undefined identifier and the second storage node with an undefined identifier, in the node group have invalid identifiers.

Step S304: The data switching device successively receives the notification message and the response message, searches the node table for route information required for forwarding the notification message to the second control node, and successively forwards the notification message and the response message to the second control node according to the found route information.

Step S305: The second control node first receives the notification message sent by the destination control node, and changes the data status identifier of the first data in the second storage node from an undefined identifier to an invalid identifier. When receiving the response message, the second control node then parses the response message to obtain the first data that is read from the destination storage node, caches the obtained first data into the second storage node, and when completing caching the first data, changes the data status identifier of the first data in the second storage node from an invalid identifier to a valid identifier. The second control node feeds back a notification message to the destination control node when completing changing the data status identifier of the first data in the second storage node (from an invalid identifier to a valid identifier). In a process in which the second control node sends the notification message to the destination control node by means of the data switching device, the second storage node has a valid identifier, the destination storage node has an undefined identifier, and all storage nodes, except the second storage node with a valid identifier and the destination storage node with an undefined identifier, in the node group have invalid identifiers.

Step S306: The data switching device receives the notification message, searches the node table for route information required for forwarding the notification message to the destination control node, and forwards the notification message to the destination control node according to the found route information.

Step S307: When receiving the notification message, the destination control node changes the data status identifier of the first data in the destination storage node from an undefined identifier to an invalid identifier. In this case, the identifier of each storage node in the node group is as follows. The second storage node has a valid identifier, and all other storage nodes other than the second storage node with the valid identifier in the storage nodes, including the destination storage node, have invalid identifiers.

In an embodiment of the present application, if a first processor node in a node group expects to write data to a memory device, a data status identifier of first data in a first cache node bus-connected to the first processor node first needs to be a valid identifier (the first data cached in the cache node is currently the latest), so that the first processor node can write data to the first cache node to update the currently latest first data, and then the first processor node can write data to the memory device. The following elaborates on an implementation procedure in which the first processor node expects to write the first data to the memory device. The implementation procedure successively includes step S401, step S402, step S403, step S404, step S405, step S406, and step S407.

It should be noted that the node group described in this embodiment may be a node group that is established to implement data consistency of the first data. Storage nodes in the node group include a cache node that is in the multiprocessor network 100 and that caches the first data, and a memory node that is in the memory device and that stores the first data; and control nodes in the node group include a processor node bus-connected to the cache node in the node group in the multiprocessor network 100, and a controller connected to the memory node in the node group.

Step S401: When a first cache node has a valid identifier, a first processor node first writes first data (updated first data), which is expected to be written to a memory node, to a cache to update first data in a cache node, and then by means of a data switching device, sends a write message that carries a write instruction to a controller of a memory device.

Step S402: The data switching device receives the write message, searches a node table for route information required for forwarding the write message to the controller of the memory device, and forwards the write message to the controller of the memory device according to the found route information.

Step S403: A processor included in the controller of the memory device receives the write message, and when detecting the write instruction in the write message, triggers a reading message, and sends the reading message to the first processor node by means of a data processing device. A data status identifier of the first data in each storage node in a node group is as follows. The first cache node has a valid identifier, and all other storage nodes other than the first cache node in storage nodes, including the memory node, have invalid identifiers.

Step S404: The data switching device receives the reading message, searches the node table for route information required for forwarding the reading message to the first processor node, and forwards the reading message to the first processor node according to the found route information.

Step S405: When receiving the reading message, the first processor node reads data specified by the reading message (namely, the first message) from the first cache node, and generates a response message. The response message carries the data specified by the reading message, and the response message is fed back to the controller of the memory device by means of the data switching device. The first processor node changes the data status identifier of the first data in the first storage node from a valid identifier to an undefined identifier when starting to send the response message. In this case, in a process in which the first processor node sends the response message to the controller of the memory device by means of the data switching device, the first cache node has an undefined identifier, and all storage nodes other than the first cache node with an undefined identifier in the node group, including the memory node, have invalid identifiers.

Step S406: The data switching device receives the response message, searches the node table for route information required for forwarding the response message to the controller of the memory device, and forwards the reading message to the controller of the memory device according to the found route information.

Step S407: The processor included in the controller of the memory device receives the response message, parses the response message to obtain the first data that is read from the first cache node, controls a memory controller to write the obtained first data to the memory node of the memory device, and when completing writing the first data to the memory node, changes the data status identifier of the first data in the memory node from an invalid identifier to a valid identifier. The processor of the memory device feeds back a notification message to the first processor node when completing changing the data status identifier of the first data in the memory node (from an invalid identifier to a valid identifier). In a process in which the processor of the memory device sends the notification message to the first processor node by means of the data switching device, the memory node has a valid identifier, the first cache node has an undefined identifier, and all storage nodes, except the memory node with a valid identifier and the first cache node with an undefined identifier in the node group have invalid identifiers.

Step S408: The data switching device receives the notification message, searches the node table for route information required for forwarding the notification message to the first processor node, and forwards the notification message to the first processor node according to the found route information.

Step S409: When receiving the notification message, the first processor node changes the data status identifier of the first data in the first cache node from an undefined identifier to an invalid identifier. In this case, the data status identifier of the first data in each storage node in the node group is as follows. The memory node has a valid identifier, and all other storage nodes other than the memory node with the valid identifier in the storage nodes, including the first cache node, have invalid identifiers.

From the foregoing embodiments, it can be properly inferred that multiple scenarios in which the second control node triggers the reading message exist and are not limited. For example, in the scenario described above, if the second control node expects to read the first data, but the cache node bus-connected to the second control node does not have a valid identifier (but has an undefined identifier or an invalid identifier), the second control node triggers the reading message. For another example, if the second control node expects to write data to the cache node bus-connected to the second control node to update the currently latest first data, but the cache node bus-connected to the second control node does not have a valid identifier (namely, the first data cached in the cache node bus-connected to the second control node may be not currently the latest), the second control node triggers the reading message. First, the first data is obtained from the storage node with a valid identifier in the node group by means of the reading message, the obtained first data is cached into the cache node bus-connected to the second control node, and the data status identifier of the first data in the cache node is changed from an invalid identifier to a valid identifier, and then data is written to the cache node to update the currently latest first data. For another example, the first processor node expects to write the first data to the memory device, and when the first cache node has a valid identifier, caches, into the first cache node beforehand, the first data expected to be written to the memory device, and then instructs the controller of the memory device to send the reading message to the first processor node to obtain the first data cached in the first cache node, so that the processor included in the controller of the memory device controls the memory controller to write the cached first data to the memory node. In this way, the first processor node completes writing the first data to the memory node of the memory device.

Figure 2:
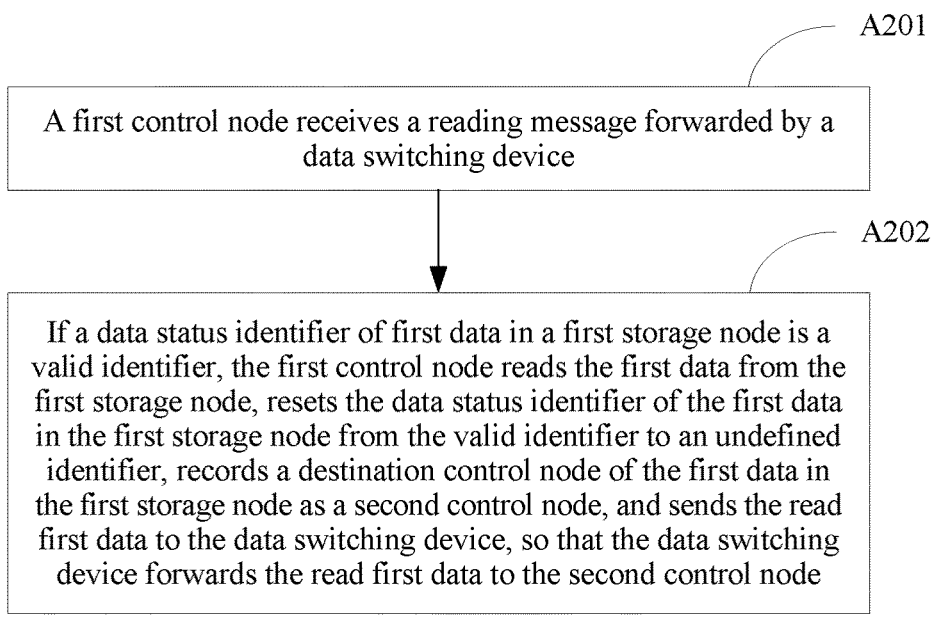
FIG. 2 is an example flowchart of a data reading method given from a perspective of a first control node.

In an embodiment of the present application, a corresponding extension is made to the foregoing embodiment to obtain a basic work procedure of a data reading method, which is shown in FIG. 2. However, for ease of description, only a part related to this embodiment of the present application is shown. The basic work procedure shown in FIG. 2 is given from a perspective of a first control node. The basic work procedure provided in FIG. 2 includes step A201 and step A202.

In this embodiment, a node group includes a storage node and a control node. The node group includes a storage node that is in a multiprocessor network 100 and that stores first data. A maximum of one storage node in the node group stores the first data whose data status identifier is a valid identifier, and the data status identifier of the first data stored in the storage node in the node group is reset to the valid identifier when the storage node in the node group stores available first data. The node group further includes a control node connected to the storage node in the node group. The control node is configured to exercise read/write control on the connected storage node, including setting a data status identifier for the first data stored in the connected storage node. The first control node is a control node in the node group, and a first storage node is a storage node that is in the node group and that is connected to the first control node. For a description about the node group, refer to the related description in the foregoing embodiment, and details are not described herein again.

Optionally, the node group described in this embodiment may be a node group that is established to implement cache coherence of the first data. Storage nodes in the node group include a cache node that is in the multiprocessor network 100 and that caches the first data, and control nodes in the node group include a processor node that is in the multiprocessor network 100 and that is bus-connected to the cache node.

Optionally, the node group described in this embodiment may be a node group that is established to implement data consistency of the first data. Storage nodes in the node group include a cache node that is in the multiprocessor network 100 and that caches the first data, and a memory node that is in the memory device and that stores the first data; and control nodes in the node group include a processor node bus-connected to the cache node in the node group in the multiprocessor network 100, and a controller connected to the memory node in the node group.

Step A201: A first control node receives a reading message forwarded by a data switching device, where the reading message is used to instruct to read first data, and the reading message is sent by a second control node to the data switching device and then forwarded by the data switching device to other control nodes other than the second control node in a node group.

Step A202: If a data status identifier of the first data in a first storage node is a valid identifier, the first control node reads the first data from the first storage node, resets the data status identifier of the first data in the first storage node from the valid identifier to an undefined identifier, records a destination control node of the first data in the first storage node as the second control node, and sends the read first data to the data switching device, so that the data switching device forwards the read first data to the second control node, where the valid identifier indicates that the first data on the first storage node is available, and the undefined identifier indicates that the destination control node provides the currently latest first data.

In this embodiment, when expecting to read the first data, the second control node first detects whether a second storage node has a valid identifier. If the second storage node does not have a valid identifier, the second control node sends the reading message to the other control nodes in the node group by means of the data switching device, and using the reading message, reads the currently latest first data from storage nodes other than the second storage node in the node group.

It should be noted that in a process in which the second control node reads the currently latest first data from the node group, a maximum of one storage node in the node group has a valid identifier, including the following two cases.

In the first case, in the process in which the second control node reads the currently latest first data from the node group, no control node but the second control node in the node group reads the first data from the node group, and one storage node in the node group has a valid identifier. In this embodiment, the storage node with the valid identifier is used as a first storage node, and a control node bus-connected to the storage node is used as a first control node.

In the second case, in the process in which the second control node reads the currently latest first data from the node group, not only the second control node but also another control node in the node group is performing message exchange with the first control node to read the currently latest first data from the first storage node. In this case, the first storage node does not have a valid identifier, and the node group includes no storage node that has a valid identifier. After the control node completes reading the currently latest first data from the first storage node by means of the first control node and setting a valid identifier for a data status identifier of the first data in a storage node connected to the control node, the control node is used as an updated first control node, and the storage node connected to the control node is used as a new first storage node.

In this case, for the reading message sent by the second control node, the first control node feeds back the first data to the second control node by means of the data switching device only when the first storage node has a valid identifier. Because the first data that is read and fed back from the first storage node by the first control node is currently the latest, it can be ensured that the first data read by the second control node is currently the latest. By analogy, each control node in the node group can read the currently latest first data from the node group when expecting to read the first data.

It should be noted that in the process in which the second control node reads the first data from the first storage node by means of the first control node, the first control node resets the data status identifier of the first data in the first storage node from a valid identifier to an undefined identifier, and a specific time point of changing the data status identifier of the first data in the first storage node from a valid identifier to an undefined identifier is not limited. For example, the first control node changes the data status identifier of the first data in the first storage node from a valid identifier to an undefined identifier when starting to send the first data stored in the first storage node to the second control node. For another example, the first control node changes the data status identifier of the first data in the first storage node from a valid identifier to an undefined identifier when sending a part of the first data to the second control node.

In the process in which the second control node reads the first data from the first storage node, if the first storage node has an undefined identifier, and the node group includes no storage node that has a valid identifier, the second control node is used as an updated first control node and the second cache node is used as a new first storage node after the second control node completes reading the currently latest first data from the first storage node by means of the first control node, caching the currently latest first data into the second cache node, and setting a valid identifier for the data status identifier of the first data in the second cache node. Then a control node in the node group expects to read the current latest first data from the node group and sends a reading message to the node group, and the control node is used as a second control node.

Optionally, if the memory device is a decoupled shared memory, the first data is read using a message between control nodes in this embodiment of the present application. Only a short time, which may be a magnitude of microseconds or even nanoseconds, is required for completing reading the currently latest first data once.

Optionally, the receiving, by a first control node, a reading message forwarded by a data switching device may comprise receiving, by the first control node, the reading message that is multicast by the data switching device to the other control nodes other than the second control node in the node group.

A node table is established in the data switching device beforehand. The node table records an address of each control node in the node group, and records route information required for forwarding a message to each control node. In an implementation process, when the control nodes to be added into the node group are determined, addresses of the determined control nodes are recorded in the node table accordingly. Because the node table is stored in the data switching device, when forwarding a message to any control node in the node group, the data switching device may search the node table for an address of a control node that matches a destination address recorded in the message, and when finding the matched address of the control node, searches for corresponding route information according to the address of the control node. Further, the data switching device may forward the message to a control node with the destination address according to the found route information.

In this embodiment, if the second storage node does not have a valid identifier, and the second control node expects to read the first data, the second control node triggers the reading message, adds a multicast instruction into the reading message, and sends the reading message that carried the multicast instruction to the data switching device, where the multicast instruction instructs to forward the reading message to the other control nodes other than the second control node in the node group. In this way, when detecting the multicast instruction in the reading message, the data switching device multicasts the reading message to the other control nodes other than the second control node in the node group. It should be noted that a multicast technology used by the data switching device is not limited. For example, a multicast protocol used for implementing the multicast technology is not limited, and the multicast technology may be continuously updated over time.

It should be noted that the multiprocessor network 100 includes a large quantity of processor nodes, but generally only some of the processor nodes process the first data. However, a possibility that all processor nodes included in the multiprocessor network 100 process the first data is not ruled out. The data forwarding device receives the reading message, and multicasts the reading message to the other control nodes other than the second control node in the node group instead of broadcasting the reading message to all processor nodes included in the multiprocessor network 100 and all controllers of memory devices. Therefore, a data communication amount required for forwarding the reading message is effectively reduced, the reading message is more purposeful, and reading efficiency is higher. Optionally, in a process in which the second control node performs message exchange with the other control nodes other than the second control node in the node group by means of the data switching device, if a communication protocol supported by the first control node is different from a communication protocol supported by the second control node, the data forwarding device may perform protocol conversion for a message of the exchange. In a process in which the second control node sends the reading message to the other control nodes in the node group, if the reading message needs to be successively forwarded by multiple data forwarding devices, conversion of a data transmission protocol may be required in the process of successive forwarding, so as to implement message exchange between each two control nodes.

Figure 3:
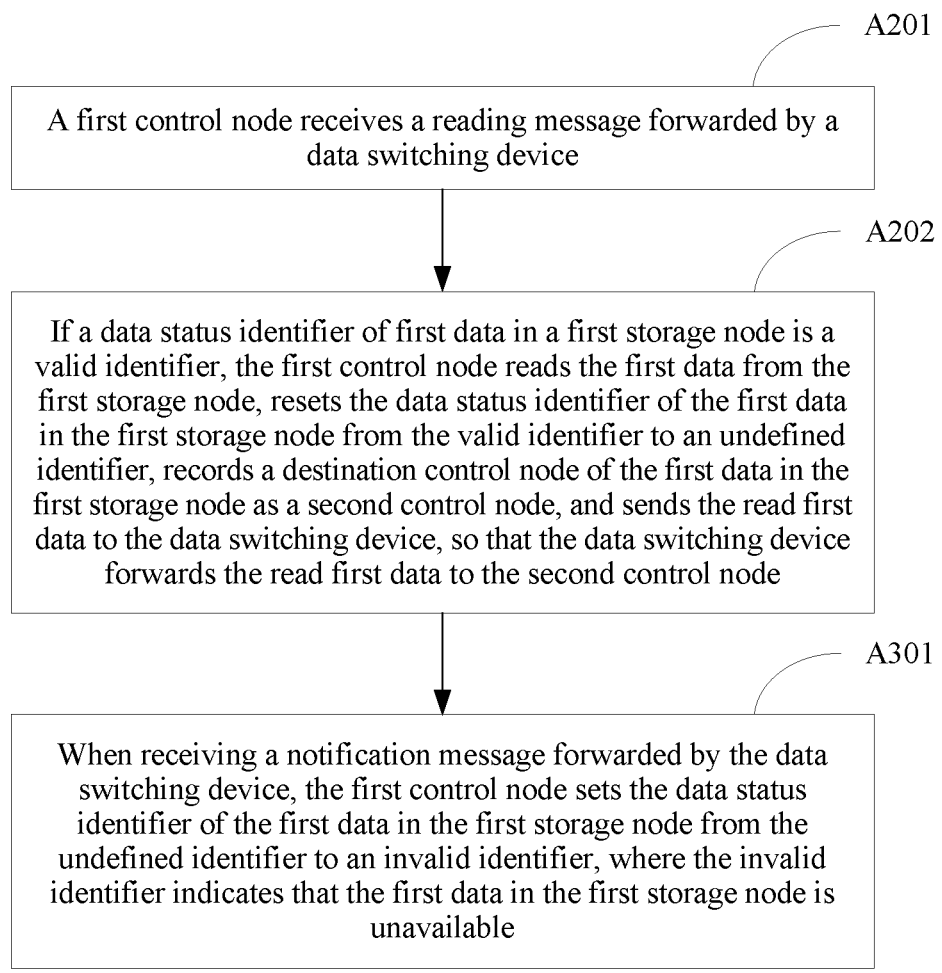
FIG. 3 is an optional example flowchart based on the data reading method in FIG. 2.

Optionally, to ensure that a maximum of one storage node in the node group has a valid identifier, a further improvement is made based on the data reading method provided in FIG. 2. As shown in FIG. 3, the method further includes step A301.

Step A301: When receiving a notification message forwarded by the data switching device, the first control node sets the data status identifier of first data in the first storage node from the undefined identifier to an invalid identifier, where the invalid identifier indicates that the first data in the first storage node is unavailable.

The notification message is sent by the second control node to the data switching device when the following condition is met: after receiving the first data sent by the first control node and caching the first data into the second storage node, the second control node sets a data status identifier of the first data in the second storage node to a valid identifier.

The second control node feeds back the notification message to the destination control node when successively completing the following operations: receiving the first data from the first control node, caching the received first data into the second storage node, and changing the data status identifier of the first data in the second storage node from an invalid identifier to a valid identifier. In a process in which the second control node sends the notification message to the destination control node by means of the data switching device, the second storage node has the valid identifier, the first storage node has the undefined identifier, and all storage nodes, except the second storage node with the valid identifier and the first storage node with the undefined identifier, in the node group have invalid identifiers.

When receiving the notification message, the first control node changes the data status identifier of the first data in the first storage node from an undefined identifier to an invalid identifier. In this case, a data status identifier of the first data in each storage node in the node group is as follows. The second storage node has a valid identifier, and all other storage nodes other than the second storage node with the valid identifier in the storage nodes, including the first storage node, have invalid identifiers.

In this way, it is ensured that a data status identifier of the first data in a storage node in which the currently latest first data is stored is a valid identifier, and data status identifiers of the first data in all other storage nodes are not valid identifiers.

Figure 4:
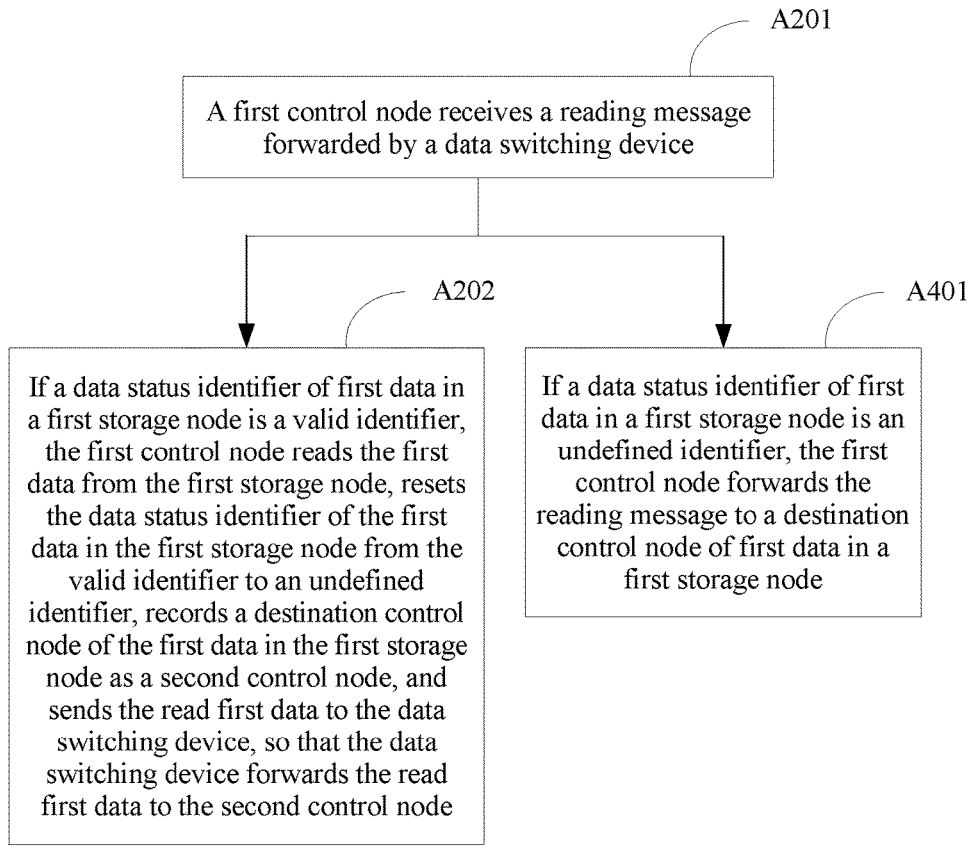
FIG. 4 is an optional example flowchart based on the data reading method in FIG. 3.

FIG. 4 is an optional work procedure based on the data reading method in FIG. 2. For ease of description, only a part related to this embodiment of the present application is illustrated.

In an embodiment of the present application, referring to FIG. 4, the method further includes step A401.

Step A401: If a data status identifier of the first data in the first storage node is an undefined identifier, the first control node forwards the reading message to the destination control node of the first data in the first storage node, so that when a data status identifier of the first data in a connected destination storage node is a valid identifier, the destination control node reads the first data from the destination storage node and sends the read first data to a data switching device, and the data switching device forwards the read first data to the second control node.

When expecting to read the first data, the second control node first detects whether the second storage node has a valid identifier. If the second storage node does not have a valid identifier, the second control node sends the reading message to the other control nodes in the node group by means of the data switching device, and using the reading message, reads the currently latest first data from storage nodes other than the second storage node in the node group.

In a process of sending the first data to the destination control node, the first control node receives the reading message sent by the second control node when the destination control node has not completed receiving the first data from the first control node. In this case, only the first storage node in the node group has an undefined identifier, and all other storage nodes other than the first storage node have invalid identifiers. When receiving the reading message, the first control node detects that the first storage node has an undefined identifier, searches for information about the destination control node (including an address of the destination control node) recorded in a catalog of the first storage node, and by means of the data forwarding device, sends the reading message to the destination control node according to the address of the destination control node.

Only after successively completing the following operations of receiving the first data from the first control node, caching the first data into the destination storage node, and setting the data status identifier of the first data in the destination storage node from an invalid identifier to a valid identifier, the destination control node responds to the reading message, reads data (namely, the first data) specified by the message from the destination storage node, and generates a response message, where the response message carries the data specified by the reading message. The destination control node feeds back the response message to the second control node by means of the data switching device, and sets the valid identifier in the destination storage node to an undefined identifier when starting to send the response message. Optionally, the first data fed back to the second control node is data obtained after the destination control node changes the first data in the destination storage node.

When receiving the response message, the second control node parses the response message to obtain the first data that is read from the destination storage node, caches the obtained first data into the second storage node, and when completing caching the first data, changes the data status identifier of the first data in the second storage node from an invalid identifier to a valid identifier. The second control node feeds back a notification message to the destination control node when completing changing the data status identifier of the first data in the second storage node (from an invalid identifier to a valid identifier). In a process in which the second control node sends the notification message to the destination control node by means of the data switching device, the second storage node has a valid identifier, the destination storage node has an undefined identifier, and all storage nodes, except the second storage node with a valid identifier and the destination storage node with an undefined identifier, in the node group have invalid identifiers.

When receiving the notification message, the destination control node changes the data status identifier of the first data in the destination storage node from an undefined identifier to an invalid identifier. In this case, the identifier of each storage node in the node group is as follows. The second storage node has a valid identifier, and all other storage nodes other than the second storage node with the valid identifier in the storage nodes, including the destination storage node, have invalid identifiers.

In this embodiment, in a process in which a second control node reads the currently latest first data from a node group, a destination control node in the node group is performing message exchange with a first control node to obtain the currently latest first data from the first control node. After the destination control node successively completes the following operations by means of the first control node: reading first data from a first storage node, caching the first data into a destination storage node, and changing a data status identifier of the first data in the destination storage node from an invalid identifier to a valid identifier, the destination control node may write data to the destination storage node to update the currently latest first data, then the destination control node feeds back the updated currently latest first data to the second control node, and the second control node stores the first data obtained from the destination control node. In this way, normal continuous updating of the first data is ensured, and correctness of the first data is ensured. Therefore, this embodiment is especially applicable to a case in which process migration is performed between control nodes in the node group in a process of processing a service based on first data, thereby ensuring that in a process of process migration for processing the first data, a control node to which a process is migrated can obtain correct first data, and ensuring correct execution of the service.

Figure 5:
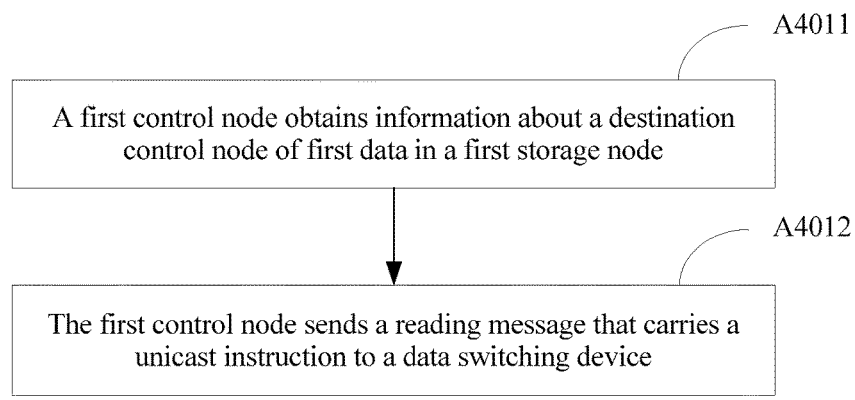
FIG. 5 is an optional example flowchart of step A401 in FIG. 4.

Optionally, details of forwarding the reading message to the destination control node in FIG. 4 are described. Referring to FIG. 5, the forwarding, by the first control node, the reading message to the destination control node of the first data in the first storage node is step A4011 and step A4012.

Step A4011: The first control node obtains information about the destination control node of the first data in the first storage node.

Step A4012: The first control node sends the reading message that carries a unicast instruction to the data switching device, so that the data switching device unicasts the reading message to the destination control node when the unicast instruction is detected and the unicast instruction is directed to the destination control node.

It should be noted that a unicast technology used by the data switching device is not limited. For example, a unicast protocol used for implementing the unicast technology is not limited, and the unicast technology may be continuously updated over time.

In a process of sending the first data to the destination control node, when the destination control node has not completed receiving the first data from the first control node, if the first control node receives the reading message sent from the second control node, the first control node detects that the first storage node has an undefined identifier, searches the catalog for the information about the destination control node (the information about the destination control node includes the address of the destination control node) corresponding to the destination control node, triggers a unicast instruction that instructs to send the reading message to the destination control node, adds the unicast instruction into the reading message, and sends the reading message that carries the unicast instruction to the data forwarding device.

The data switching device receives the reading message. When detecting the unicast instruction in the received reading message, the data switching device searches the node table for route information required for expecting to forward the reading message to the destination control node, and unicasts the reading message to the destination control node according to the found route information.

In this way, the reading message is forwarded in a unicast manner in the node group, the reading message is more directional, the data communication amount can be reduced, and bandwidth occupation can be reduced.

Figure 6:
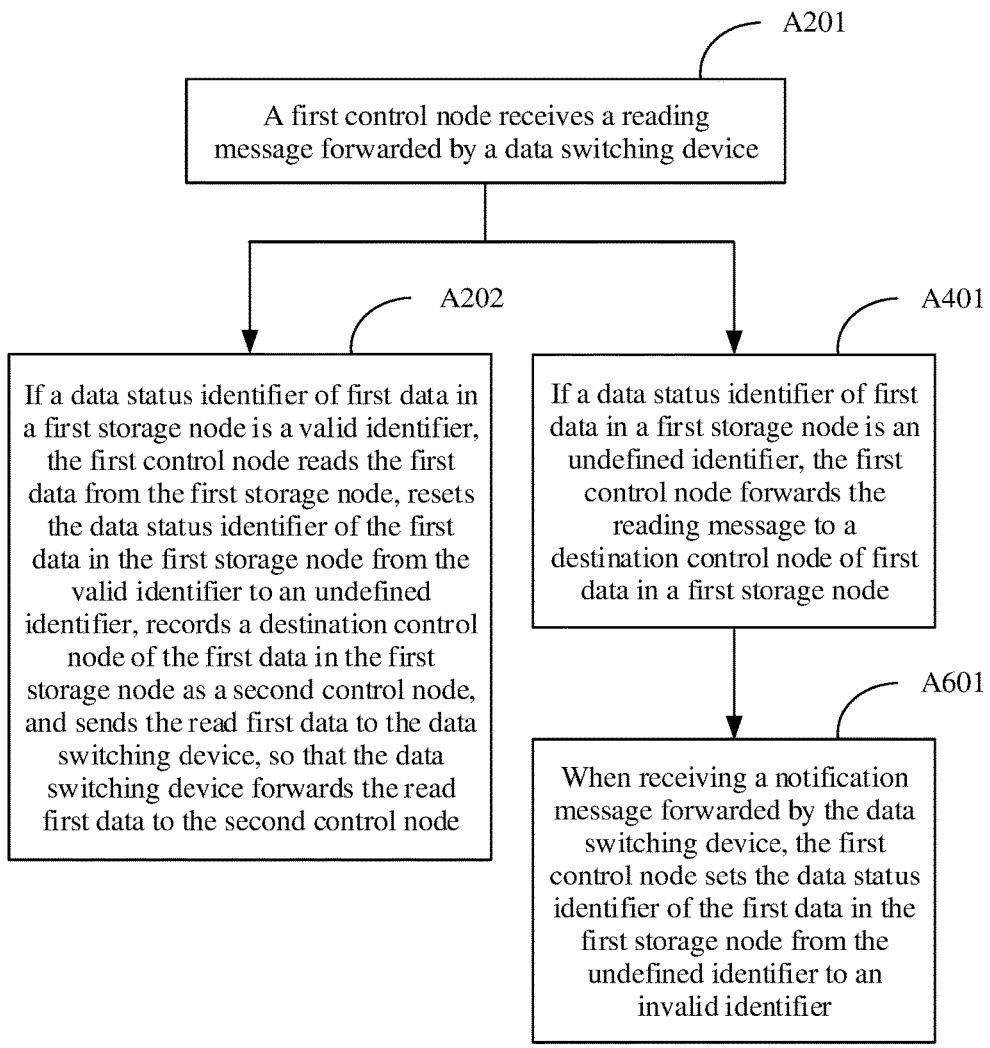
FIG. 6 is an optional example flowchart based on the data reading method in FIG. 4.

Optionally, a further improvement is made to the data reading method provided in FIG. 4. As shown in FIG. 6, the method further includes step A601.

Step A601: When receiving a notification message forwarded by the data switching device, the first control node sets the data status identifier of the first data in the first storage node from the undefined identifier to an invalid identifier, where the invalid identifier indicates that the first data in the first storage node is unavailable.

The notification message is sent by the destination control node to the data switching device when the following condition is met: after receiving the first data sent by the first control node and caching the first data into the destination storage node, the destination control node sets the data status identifier of the first data in the destination storage node to the valid identifier.

For details about implementation of step A601, refer to the detailed description about step A401, and details are not described herein again. After successively completing the following operations: receiving the first data from the first control node, caching the first data into the destination storage node, and setting the invalid identifier of the destination storage node to a valid identifier, the destination control node responds to the reading message, reads data (namely, the first data) specified by the message from the destination storage node, and generates a response message, where the response message carries the data specified by the reading message. The destination control node feeds back the response message to the second control node by means of the data switching device. When receiving the response message, the second control node parses the response message to obtain the first data that is read from the destination storage node, caches the obtained first data into the second storage node, and changes the invalid identifier in the second storage node to a valid identifier when completing caching the first data.

In this embodiment, it is ensured that a maximum of one storage node in the node group has a valid identifier, and the storage node with a valid identifier stores the currently latest first data. When the storage node has a valid identifier, a control node connected to the storage node can modify the first data stored in the storage node, and update the currently latest first data.

In an embodiment of the present application, a condition for which the reading message is sent by the second control node to the data switching device includes the second control node needs to write updated first data to the connected second storage node, and the data status identifier of the first data in the second storage node is not the valid identifier.

The second control node expects to update the currently latest first data. If the second storage node (a storage node connected to the second control node) does not have a valid identifier, the second control node cannot write data to the second storage node to update the first data, but needs to trigger the reading message, send the reading message to other control nodes other than the second control node in the node group to read the currently latest first data from the storage node with a valid identifier, store the read currently latest first data into the second storage node, and change the data status identifier of the first data in the second storage node to a valid identifier; and then the second control node can write data to the second storage node (with a valid identifier) to update the currently latest first data.

For example, the second control node is a processor node in the node group, and the processor node expects to write data to a cache node bus-connected to the processor node to update the first data in the cache node. If the cache node does not have a valid identifier, the processor node triggers the reading message.

For example, the second control node is a processor node in the node group, and the processor node expects to update the first data and write back the updated first data to the memory node of the memory device. If the cache node bus-connected to the processor node does not have a valid identifier, the processor node triggers the reading message. The second control node performs message exchange with processor nodes other than the processor node in the node group to read the currently latest first data from the storage node with a valid identifier in the node group, store the read first data into the cache node bus-connected to the processor node, and set an identifier of the cache node to a valid identifier. Then the processor node can write data to the cache node first to update the currently latest first data, and then notify a controller of the memory device, so as to trigger the controller to generate a reading message. For example, the processor node sends a write-back message to the controller of the memory device, and according to the received write-back message, the controller triggers the reading message directed to the processor node. The controller sends the reading message to the processor node by means of the data switching device, so as to read the updated first data from the cache node. The processor in the controller controls the memory controller to write the read first data to the memory node, and the second control node completes writing the updated currently latest first data to the memory node.

In an embodiment of the present application, a condition for which the reading message is sent by the second control node to the data switching device is the second control node receives a write-back message.

Storage nodes in the node group include a memory node that is in the multiprocessor network 100 and stores the first data, and a cache node that is in the multiprocessor network 100 and is configured to store mirrored data of the first data; control nodes in the node group include a processor node bus-connected to the cache node in the node group, and a controller connected to the memory node; the second control node is a controller in the node group, and the first control node is a processor node, in the node group, that sends the write-back message; the write-back message is sent by the processor node in the node group to the controller in the node group by means of the data switching device when the data status identifier of the first data in the bus-connected cache node is the valid identifier and the first data needs to be written back to the memory node in the node group.

If the cache node bus-connected to the processor node has a valid identifier, and the first data stored in the cache node is expected to be written back to the memory node in the node group, the processor node in the node group sends the write-back message to the controller connected to the memory node. When receiving the write-back message, the controller triggers the reading message directed to the processor node, so as to save network bandwidth. For an exchange procedure in which the processor node responds to the reading message sent by the controller, refer to the exchange procedure described above about how the first control node responds to the reading message sent by the second control node, and details are not described herein again.

Figure 7:
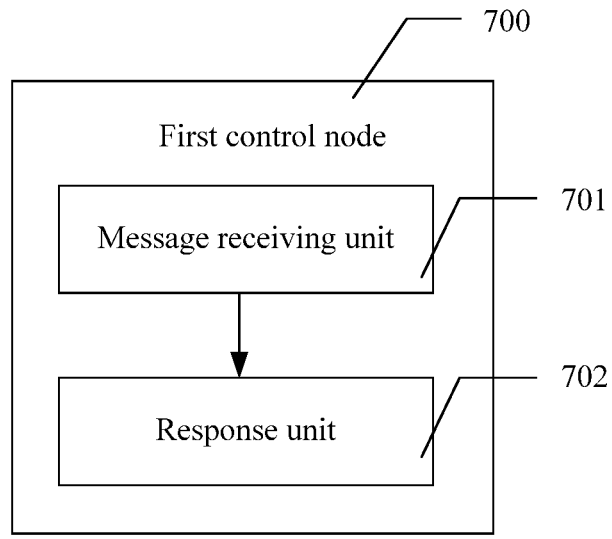
FIG. 7 is a schematic diagram of a logical structure according to a first control node 700 in an embodiment of the present application.

FIG. 7 is a schematic diagram of a logical structure of a first control node 700 according to an embodiment of the present application. As shown in FIG. 7, the first control node 700 includes a message receiving unit 701 configured to receive a reading message forwarded by a data switching device, where the reading message is used to instruct to read first data, and the reading message is sent by a second control node to the data switching device and then forwarded by the data switching device to other control nodes other than the second control node in a node group; and a response unit 702 configured to, if a data status identifier of the first data in a first storage node is a valid identifier, read the first data from the first storage node, reset the data status identifier of the first data in the first storage node from the valid identifier to an undefined identifier, record a destination control node of the first data in the first storage node as the second control node, and send the read first data to the data switching device, so that the data switching device forwards the read first data to the second control node, where the valid identifier indicates that the first data on the first storage node is available, and the undefined identifier indicates that the destination control node provides currently latest first data.

The node group includes a storage node that is in a multiprocessor network 100 and that stores the first data, a maximum of one storage node in the node group stores the first data whose data status identifier is a valid identifier, and the data status identifier of the first data stored in the storage node in the node group is reset to the valid identifier when the storage node in the node group stores available first data; the node group further includes a control node connected to the storage node in the node group; the control node is configured to exercise read/write control on the connected storage node, including setting a data status identifier for the first data stored in the connected storage node; the first control node is a control node in the node group, and the first storage node is a storage node that is in the node group and that is connected to the first control node.

Optionally, that the message receiving unit 701 receives a reading message forwarded by the data switching device may comprise the message receiving unit 701 is configured to receive the reading message that is multicast by the data switching device to the other control nodes other than the second control node in the node group.

Optionally, the response unit 702 is further configured to, when receiving a notification message forwarded by the data switching device, set the data status identifier of the first data in the first storage node from the undefined identifier to an invalid identifier, where the invalid identifier indicates that the first data in the first storage node is unavailable.

The notification message is sent by the second control node to the data switching device when the following condition is met: after receiving the first data sent by the first control node and caching the first data into the second storage node, the second control node sets a data status identifier of the first data in the second storage node to a valid identifier.

Optionally, the response unit 702 is further configured to, if the data status identifier of the first data in the first storage node is the undefined identifier, forward the reading message to the destination control node of the first data in the first storage node, so that when a data status identifier of the first data in a connected destination storage node is a valid identifier, the destination control node reads the first data from the destination storage node and sends the read first data to the data switching device, and the data switching device forwards the read first data to the second control node.

Optionally, that the response unit 702 is further configured to forward the reading message to the destination control node of the first data in the first storage node may comprise the response unit 702 is configured to obtain information about the destination control node of the first data in the first storage node, generate, according to the information about the destination control node, a unicast instruction directed to the destination control node, and send the reading message that carries the unicast instruction to the data switching device, so that the data switching device unicasts the reading message to the destination control node when the unicast instruction is detected.

Optionally, the response unit 702 is further configured to, when receiving a notification message forwarded by the data switching device, set the data status identifier of the first data in the first storage node from the undefined identifier to an invalid identifier, where the invalid identifier indicates that the first data in the first storage node is unavailable.

The notification message is sent by the destination control node to the data switching device when the following condition is met: after receiving the first data sent by the first control node and caching the first data into the destination storage node, the destination control node sets the data status identifier of the first data in the destination storage node to the valid identifier.

Optionally, a condition for which the reading message is sent by the second control node to the data switching device includes the second control node needs to write updated first data to the connected second storage node, and the data status identifier of the first data in the second storage node is not the valid identifier.

Optionally, a condition for which the reading message is sent by the second control node to the data switching device is the second control node receives a write-back message.

Storage nodes in the node group include a memory node that is in the multiprocessor network 100 and stores the first data, and a cache node that is in the multiprocessor network 100 and is configured to store mirrored data of the first data; control nodes in the node group include a processor node bus-connected to the cache node in the node group, and a controller connected to the memory node; the second control node is a controller in the node group, and the first control node is a processor node, in the node group, that sends the write-back message; the write-back message is sent by the processor node in the node group to the controller in the node group by means of the data switching device when the data status identifier of the first data in the bus-connected cache node is the valid identifier and the first data needs to be written back to the memory node in the node group.

Figure 8:
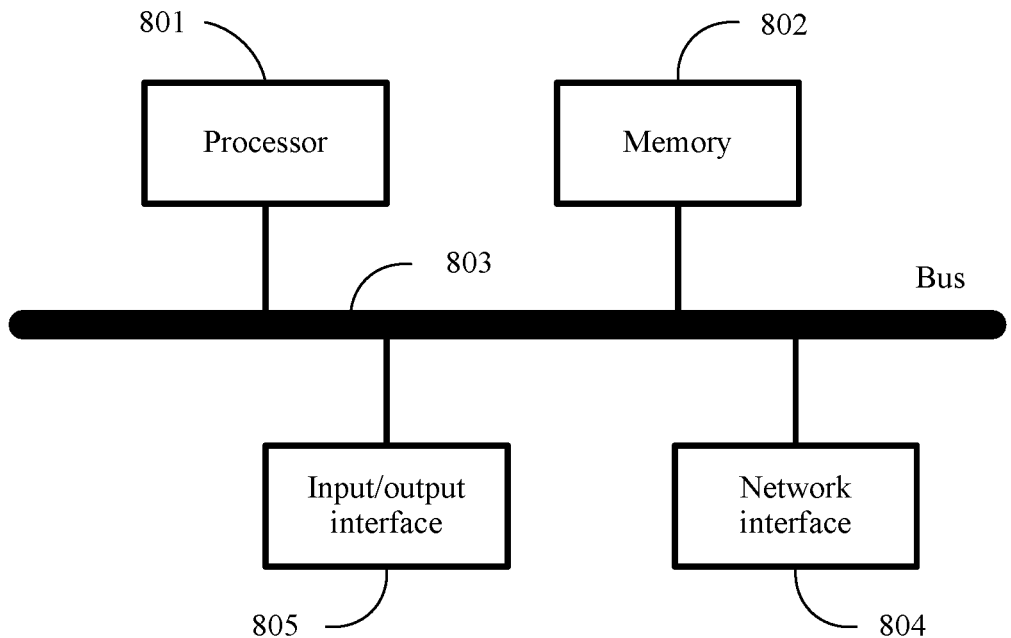
FIG. 8 is a schematic diagram of a hardware structure according to a first control node 800 in an embodiment of the present application.

In an embodiment of the present application, FIG. 8 is a schematic diagram of a hardware structure of a first control node 800 according to this embodiment of the present application, and shows a hardware structure of the first control node 800. As shown in FIG. 8, the first control node 800 includes a processor 801, a memory 802, and a network interface 804, and the processor 801 is connected to the memory 802 and the network interface 804 using a bus 803.

The memory 802 is configured to store a computer-executable instruction, and when the first control node 800 runs, the processor 801 reads the computer-executable instruction stored in the memory 802 to execute the data reading method provided from a perspective of the first control node 800. For specific implementation of the data reading method, refer to the procedure of the data reading method provided in the foregoing embodiments, and details are not described herein again.

The processor 801 may be a general-purpose CPU, a microprocessor, an application-specific integrated circuit (ASIC), or one or more integrated circuits, and is configured to execute a related program to implement the technical solutions provided in the embodiments of the present application, for example, implement the data reading method provided in the foregoing embodiments.

The memory 802 may be a read only memory (ROM), a static memory device, a dynamic memory device, or a random access memory (RAM). The memory 802 may store an operating system or another application. When the technical solutions provided in the embodiments of the present application are implemented using software or firmware, program code used to implement the technical solutions provided in the embodiments of the present application is stored in the memory 802, for example, the program code applied to the data reading method provided in the foregoing embodiments of the first control node 800 is stored in the memory 802, and the program code is executed by the processor 801.

The network interface 804 uses a transceiver apparatus including but without being limited to a transceiver to implement network communication between the first control node 800 and other devices or communication networks. Optionally, the network interface 804 may be any one of various interfaces used to access a network, for example, an Ethernet interface used to access the Ethernet, including but without being limited to an RJ-45 interface, an RJ-11 interface, a standard connector (SC) fiber interface, a fiber distributed data interface (FDDI) interface, an attachment unit interface (AUI) interface, a Bayonet Neill—Concelman (BNC) interface, and a Console interface.

The bus 803 may include a path for transmitting information between parts (for example, the processor 801, the memory 802, and the network interface 804) in the first control node 800.

Optionally, the first control node 800 further includes an input/output interface 805, and the input/output interface 805 is configured to receive input data and information, and output data such as an operation result.

It should be noted that the first control node 800 shown in FIG. 8 shows only the processor 801, the memory 802, the network interface 804, and the bus 803. However, in a specific implementation process, a person skilled in the art should understand that the first control node 800 further includes other components required for implementing normal operation. In addition, depending on specific requirements, a person skilled in the art should understand that the first control node 800 may further include hardware components for implementing other additional functions. In addition, a person skilled in the art should understand that the first control node 800 may include only the components required for implementing the embodiments of the present application, without including all components shown in FIG. 8.

Figure 9:
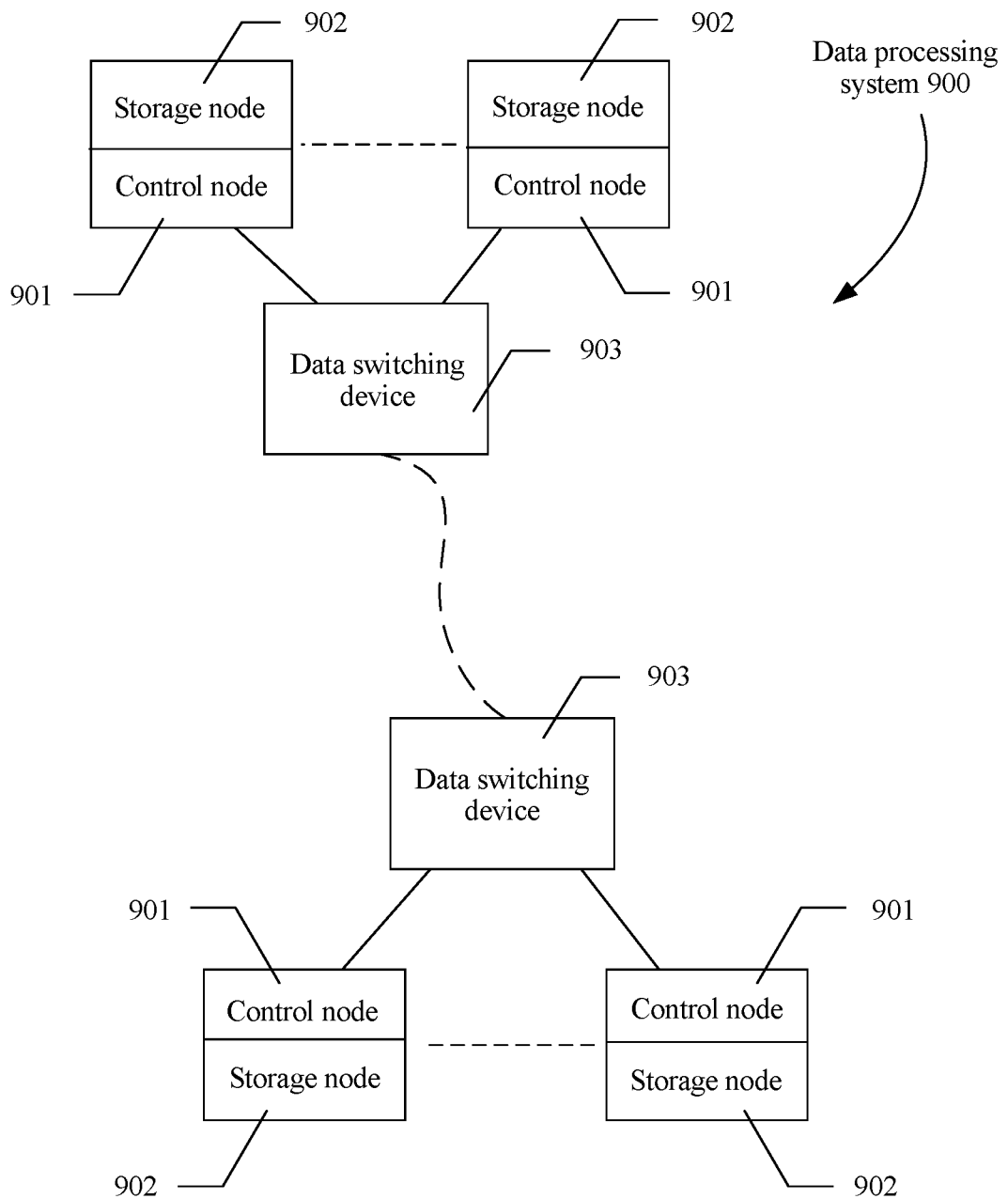
FIG. 9 is a schematic diagram of a system logical structure according to a data processing system 900 in an embodiment of the present application.

In an embodiment of the present application, a data processing system 900 is provided. Referring to FIG. 9, the data processing system 900 is applied to a multiprocessor network 100; the data processing system 900 includes a storage node 902 that is in the multiprocessor network 100 and that stores first data, a control node 901 connected to the storage node 902, one or more data switching devices 903, where each two control nodes 901 are communicatively connected using the data switching device 903. The node group includes a storage node 902 in the data processing system 900 and a control node 901 in the data processing system 900, a maximum of one storage node 902 in the node group stores the first data whose data status identifier is a valid identifier, and the data status identifier of the first data stored in the storage node in the node group is reset to the valid identifier when the storage node 902 in the node group stores available first data. The control node 901 is configured to exercise read/write control on the connected storage node 902, including setting a data status identifier for the first data stored in the connected storage node 902. A first control node is a control node 901 in the node group, and a first storage node is a storage node 902 that is in the node group and that is connected to the first control node. A second control node is a control node 901 in the node group, and a second storage node is a storage node 902 that is in the node group and that is connected to the second control node. The first control node is different from the second control node, and the first storage node is different from the first storage node.

The second control node is configured to send a reading message to the data switching device 903, where the reading message is used to instruct to read the first data.

The data switching device 903 is configured to, when receiving the reading message sent by the second control node, forward the reading message to other control nodes other than the second control node in the node group.

The first control node is configured to, when receiving the reading message forwarded by the data switching device 903, if the data status identifier of the first data in the first storage node is the valid identifier, read the first data from the first storage node, reset the data status identifier of the first data in the first storage node from the valid identifier to an undefined identifier, record a destination control node of the first data in the first storage node as the second control node, and send the read first data to the data switching device 903, where the valid identifier indicates that the first data on the first storage node is available, and the undefined identifier indicates that the destination control node provides the currently latest first data.

The data switching device 903 is further configured to forward the read first data to the second control node.

Optionally, that the data switching device 903 is configured to, when receiving the reading message sent by the second control node, forward the reading message to other control nodes other than the second control node in the node group may comprise the data switching device 903 is configured to receive the reading message that is sent by the second control node and carries a multicast instruction, and multicast the reading message to other control nodes other than the second control node in the node group when the read instruction is detected.

Optionally, the second control node is further configured to, after receiving the first data sent by the first control node and caching the first data into the second storage node, set a data status identifier of the first data in the second storage node to the valid identifier, and send a notification message directed to the first control node to the data switching device 903.

The data switching device 903 is further configured to forward the notification message to the first control node.

The first control node is further configured to, when receiving the notification message forwarded by the data switching device 903, set the data status identifier of the first data in the first storage node from the undefined identifier to an invalid identifier, where the invalid identifier indicates that the first data in the first storage node is unavailable.

Optionally, the first control node is further configured to, when receiving the reading message forwarded by the data switching device 903, if the data status identifier of the first data in the first storage node is the undefined identifier, forward the reading message to the destination control node of the first data in the first storage node, so that when a data status identifier of the first data in a connected destination storage node is a valid identifier, the destination control node reads the first data from the destination storage node and sends the read first data to the data switching device 903, and the data switching device 903 forwards the read first data to the second control node.

Optionally, that the first control node is configured to forward the reading message to the destination control node of the first data in the first storage node may comprise the first control node is configured to obtain information about the destination control node of the first data in the first storage node, generate, according to the information about the destination control node, a unicast instruction directed to the destination control node, and send the reading message that carries the unicast instruction to the data switching device 903, so that the data switching device 903 unicasts the reading message to the destination control node when the unicast instruction is detected and the unicast instruction is directed to the destination control node.

Optionally, the first control node is further configured to, when receiving the notification message forwarded by the data switching device 903, set the data status identifier of the first data in the first storage node from the undefined identifier to an invalid identifier, where the invalid identifier indicates that the first data in the first storage node is unavailable.

The notification message is sent by the destination control node to the data switching device 903 when the following condition is met, after receiving the first data sent by the first control node and caching the first data into the destination storage node, the destination control node sets the data status identifier of the first data in the destination storage node to the valid identifier.

Optionally, a condition for which the reading message is sent by the second control node to the data switching device 903 includes the second control node needs to write updated first data to the connected second storage node, and the data status identifier of the first data in the second storage node is not the valid identifier.

In this embodiment, the node group may be a node group that is established to implement cache coherence of the first data. Storage nodes 902 in the node group include a cache node that is in the multiprocessor network 100 and that caches the first data, and control nodes 901 in the node group include a processor node that is in the multiprocessor network 100 and that is bus-connected to the cache node. Alternatively, the node group may be a node group that is established to implement data consistency of the first data. Storage nodes 902 in the node group include a cache node that is in the multiprocessor network 100 and that caches the first data, and a memory node that is in the memory device and that stores the first data; and control nodes 901 in the node group include a processor node bus-connected to the cache node in the node group in the multiprocessor network 100, and a controller connected to the memory node in the node group.

Optionally, the node group is a node group that is established to implement data consistency of the first data. Storage nodes 902 in the node group include a cache node that is in the multiprocessor network 100 and that caches the first data, and a memory node that is in the memory device and that stores the first data; and control nodes 901 in the node group include a processor node bus-connected to the cache node in the node group in the multiprocessor network 100, and a controller connected to the memory node in the node group.

A condition for which the reading message is sent by the second control node to the data switching device 903 is the second control node receives a write-back message.

Storage nodes 902 in the node group include a memory node that is in the multiprocessor network 100 and stores the first data, and a cache node that is in the multiprocessor network 100 and is configured to store mirrored data of the first data; control nodes 901 in the node group include a processor node bus-connected to the cache node in the node group, and a controller connected to the memory node; the second control node is a controller in the node group, and the first control node is a processor node in the node group, that sends the write-back message; the write-back message is sent by the processor node in the node group to the controller in the node group by means of the data switching device 903 when the data status identifier of the first data in the bus-connected cache node is the valid identifier and the first data needs to be written back to the memory node in the node group.

In the several embodiments provided in the present application, it should be understood that the disclosed system, device, and method may be implemented in other manners. For example, the described device embodiment is merely an example. For example, the module and unit division is merely logical function division and may be other division during implementation. For example, a plurality of modules, units or components may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts as modules may or may not be physical modules, may be located in one position, or may be distributed on a plurality of network modules. Some or all the modules may be selected according to actual needs to achieve the objectives of the solutions of the embodiments.

In addition, functional modules in the embodiments of the present application may be integrated into one processing module, or each of the modules may exist alone physically, or two or more modules are integrated into one module. The integrated module may be implemented in a form of hardware, or may be implemented in a form of hardware in addition to a software functional module.

When the foregoing integrated module is implemented in a form of a software functional module, the integrated unit may be stored in a computer-readable storage medium. The software functional module is stored in a storage medium and includes several instructions for instructing a computer device (which may be a personal computer, a server, or a network device) to perform some of the steps of the methods described in the embodiments of the present application. The foregoing storage medium includes any medium that can store program code, such as a universal serial bus (USB) flash drive, a removable hard disk, a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A data reading method, comprising:
    receiving, by a first control node, a reading message from a second control node and forwarded by a data switching device, wherein the reading message is used to instruct to read first data;
    reading, by the first control node, the first data from a first storage node when a data status identifier of the first data in the first storage node is a valid identifier;
    resetting the data status identifier of the first data in the first storage node from the valid identifier to an undefined identifier;

recording a destination control node of the first data in the first storage node as the second control node; and sending the read first data to the data switching device in order to be sent to the second control node, wherein the valid identifier indicates that the first data on the first storage node is available, wherein the undefined identifier indicates that the destination control node provides currently latest first data, wherein a node group comprises a storage node and a control node coupled to the storage node, wherein a maximum of one storage node in the node group stores the first data whose data status identifier is a valid identifier, wherein the data status identifier of the first data stored in the storage node in the node group is reset to the valid identifier when the storage node in the node group stores available first data, wherein the control node in the node group is configured to exercise read/write control on the storage node coupled to the control node, wherein the read/write control comprises setting a data status identifier for the first data, wherein either of the first control node or the second control node is a control node in the node group, and wherein the first storage node is a storage node in the node group and coupled to the first control node.

2. The method according to claim 1, further comprising setting, by the first control node, the data status identifier of the first data in the first storage node from the undefined identifier to an invalid identifier when receiving a notification message from the second control node, wherein the invalid identifier indicates that the first data in the first storage node is unavailable.

3. The method according to claim 1, further comprising forwarding, by the first control node, the reading message to the destination control node when the data status identifier of the first data in the first storage node is the undefined identifier.

4. The method according to claim 3, wherein forwarding, by the first control node, the reading message to the destination control node comprises:

obtaining, by the first control node, information about the destination control node; and sending, by the first control node, the reading message to the data switching device in order to be sent to the destination control node.

5. The method according to claim 3, further comprising setting, by the first control node, the data status identifier of the first data in the first storage node from the undefined identifier to an invalid identifier when receiving a notification message from the destination control node, wherein the invalid identifier indicates that the first data in the first storage node is unavailable.

6. The method according to claim 2, wherein the reading message is sent by the second control node to the data switching device when the second control node needs to write updated first data to the second storage node, and the data status identifier of the first data in the second storage node is not the valid identifier.

7. The method according to claim 1, wherein storage nodes in the node group comprise:

a memory node configured to store the first data; and a cache node configured to store mirrored data of the first data, wherein control nodes in the node group comprise:

a processor node bus-connected to the cache node in the node group; and a controller coupled to the memory node, wherein the second control node is a controller in the node group, wherein the first control node is a processor node, in the node group, that sends a write-back message received by the second control node, and wherein the write-back message is sent by the processor node in the node group to the controller in the node group by means of the data switching device when the data status identifier of the first data in the bus-connected cache node is the valid identifier and the first data needs to be written back to the memory node in the node group.

8. A first control node, comprising:

a processor; and a memory coupled to the processor and storing instructions for execution by the processor, wherein the instructions instruct the processor to:

receive a reading message from a second control node and then forwarded by a data switching device, wherein the reading message is used to instruct to read first data;

read the first data from a first storage node when a data status identifier of the first data in the first storage node is a valid identifier;

reset the data status identifier of the first data in the first storage node from the valid identifier to an undefined identifier;

record a destination control node of the first data in the first storage node as the second control node; and send the read first data to the data switching device in order to be sent to the second control node, wherein the valid identifier indicates that the first data on the first storage node is available, wherein the undefined identifier indicates that the destination control node provides currently latest first data, wherein a node group comprises a storage node and a control node coupled to the storage node, wherein a maximum of one storage node in the node group stores the first data whose data status identifier is a valid identifier, wherein the data status identifier of the first data stored in the storage node in the node group is reset to the valid identifier when the storage node in the node group stores available first data, wherein the control node in the node group is configured to exercise read/write control on the storage node coupled to the control node, wherein the read/write control comprises setting a data status identifier for the first data, wherein either the first control node or the second control node is a control node in the node group, and wherein the first storage node is a storage node in the node group and coupled to the first control node.

9. The first control node according to claim 8, wherein the instructions further instruct the processor to set the data status identifier of the first data in the first storage node from the undefined identifier to an invalid identifier when receiving a notification message from the second control node, wherein the invalid identifier indicates that the first data in the first storage node is unavailable.

10. The first control node according to claim 8, wherein the instructions further instruct the processor to forward the reading message to the destination control node when the data status identifier of the first data in the first storage node is the undefined identifier.

11. The first control node according to claim 10, wherein the instructions further instruct the processor to:
obtain information about the destination control node;
generate, according to the information about the destination control node, a unicast instruction directed to the destination control node; and
send the reading message that carries the unicast instruction to the data switching device.

12. The first control node according to claim 10, wherein the instructions further instruct the processor to set the data status identifier of the first data in the first storage node from the undefined identifier to an invalid identifier when receiving a notification message from the destination control node, wherein the invalid identifier indicates that the first data in the first storage node is unavailable.

13. The first control node according to claim 9, wherein the reading message is sent by the second control node to the data switching device when the second control node needs to write updated first data to the second storage node, and wherein the data status identifier of the first data in the second storage node is not the valid identifier.

14. The first control node according to claim 8, wherein storage nodes in the node group comprise:
a memory node configured to store the first data; and
a cache node configured to store mirrored data of the first data,
wherein control nodes in the node group comprise:
a processor node bus-connected to the cache node in the node group; and
a controller coupled to the memory node,
wherein the second control node is a controller in the node group,
wherein the first control node is a processor node, in the node group, that sends a write-back message received by the second control node, and
wherein the write-back message is sent by the processor node in the node group to the controller in the node group by means of the data switching device when the data status identifier of the first data in the bus-connected cache node is the valid identifier and the first data needs to be written back to the memory node in the node group.

15. A data processing system, wherein the data processing system is applied to a multiprocessor network, wherein the data processing system comprises:
a storage node that is in the multiprocessor network and that stores first data;
a control node coupled to the storage node; and
one or more data switching devices, wherein each two control nodes are communicatively connected using the data switching device;
a node group comprising a storage node in the data processing system and a control node in the data processing system, wherein a maximum of one storage node in the node group stores the first data whose data status identifier is a valid identifier, wherein the data status identifier of the first data stored in the storage node in the node group is reset to the valid identifier when the storage node in the node group stores available first data, wherein the control node is configured to exercise read/write control on the storage node coupled to the control node, wherein the read/write control comprises setting a data status identifier for the first data;
a first control node;
a second control node, wherein either the first control node or the second control node is a control node in the node group;
a first storage node is a storage node that is in the node group and that is coupled to the first control node; and
a second storage node is a storage node that is in the node group and that is coupled to the second control node,
wherein the second control node is configured to send a reading message to the data switching device, wherein the reading message is used to instruct to read the first data,
wherein the data switching device is configured to forward the reading message to other control nodes other than the second control node in the node group when receiving the reading message received from the second control node,
wherein the first control node is configured to
read the first data from the first storage node when receiving the reading message from the data switching device, when the data status identifier of the first data in the first storage node is the valid identifier;
reset the data status identifier of the first data in the first storage node from the valid identifier to an undefined identifier;
record a destination control node of the first data in the first storage node as the second control node; and
send the first data to the data switching device,
wherein the valid identifier indicates that the first data on the first storage node is available,
wherein the undefined identifier indicates that the destination control node provides currently latest first data, and
wherein the data switching device is further configured to forward the first data to the second control node.

16. The data processing system according to claim 15, wherein the second control node is further configured to:
set a data status identifier of the first data in the second storage node to the valid identifier after receiving the first data sent by the first control node and caching the first data into the second storage node; and
send a notification message directed to the first control node to the data switching device,
wherein the data switching device is further configured to forward the notification message to the first control node,
wherein the first control node is further configured to set the data status identifier of the first data in the first storage node from the undefined identifier to an invalid identifier when receiving the notification message from the data switching device, and
wherein the invalid identifier indicates that the first data in the first storage node is unavailable.

17. The data processing system according to claim 15, wherein the first control node is further configured to forward the reading message to the destination control node of the first data in the first storage node when receiving the reading message from the data switching device, when the data status identifier of the first data in the first storage node is the undefined identifier, so that the destination control node reads the first data from a coupled destination storage node and sends the first data to the data switching device when a data status identifier of the first data in the destination storage node is a valid identifier, and wherein the data switching device forwards the first data to the second control node.

18. The data processing system according to claim 17, wherein that the first control node is configured to forward the reading message to the destination control node of the first data in the first storage node comprises the first control node being configured to:
- obtain information about the destination control node of the first data in the first storage node;
- generate, according to the information about the destination control node, a unicast instruction directed to the destination control node; and
- send the reading message that carries the unicast instruction to the data switching device, so that the data switching device unicasts the reading message to the destination control node when the unicast instruction is detected and the unicast instruction is directed to the destination control node.

19. The data processing system according to claim 17, wherein the first control node is further configured to set the data status identifier of the first data in the first storage node from the undefined identifier to an invalid identifier when receiving a notification message from the data switching device, wherein the invalid identifier indicates that the first data in the first storage node is unavailable, and wherein the notification message is sent by the destination control node to the data switching device when, after receiving the first data sent by the first control node and caching the first data into the destination storage node, the destination control node sets the data status identifier of the first data in the destination storage node to the valid identifier.

20. The data processing system according to claim 15, wherein a condition for which the reading message is sent by the second control node to the data switching device is met when the second control node needs to write updated first data to the second storage node, and the data status identifier of the first data in the second storage node is not the valid identifier, or, the second control node receives a write-back message,
  wherein storage nodes in the node group comprise:
    a memory node in the multiprocessor network and configured to store the first data; and
    a cache node in the multiprocessor network and configured to store mirrored data of the first data,
  wherein control nodes in the node group comprise:
    a processor node bus-connected to the cache node in the node group; and
    a controller coupled to the memory node,
  wherein the second control node is a controller in the node group,
  wherein the first control node is a processor node, in the node group, that sends the write-back message, and
  wherein the write-back message is sent by the processor node in the node group to the controller in the node group by means of the data switching device when the data status identifier of the first data in the bus-connected cache node is the valid identifier and the first data needs to be written back to the memory node in the node group.

* * * * *